US012610091B2

(12) United States Patent  (10) Patent No.: US 12,610,091 B2
Azmy et al.  (45) Date of Patent: Apr. 21, 2026

(54) TECHNIQUES FOR PROVIDING VIDEO PROGRAMS FOR PASSENGERS ON COMMERCIAL PASSENGER VEHICLES

(71) Applicant: Panasonic Avionics Corporation, Irvine, CA (US)

(72) Inventors: John Azmy, Orange, CA (US); Karim Chebil, Newport Coast, CA (US)

(73) Assignee: Panasonic Avionics Corporation, Irvine, CA (US)

( * ) Notice: Subject to any disclaimer, the term of this patent is extended or adjusted under 35 U.S.C. 154(b) by 50 days.

(21) Appl. No.: 18/315,328

(22) Filed: May 10, 2023

(65) Prior Publication Data

US 2024/0380930 A1     Nov. 14, 2024

(51) Int. Cl.
*H04N 21/214*     (2011.01)
*B64D 11/00*     (2006.01)
(Continued)

(52) U.S. Cl.
CPC ... *H04N 21/2146* (2013.01); *B64D 11/00155* (2014.12); *H04N 21/2665* (2013.01); *H04N 21/6143* (2013.01)

(58) Field of Classification Search
CPC .......... H04N 21/2146; H04N 21/2665; H04N 21/6143; B64D 11/00155
See application file for complete search history.

(56) References Cited

U.S. PATENT DOCUMENTS 6,810,527 B1   10/2004  Conrad et al.
2016/0119052 A1   4/2016  Frerking et al.
2023/0275944 A1*  8/2023  Slater ............... H04N 21/47202
709/231

FOREIGN PATENT DOCUMENTS

EP     1320948 B2   8/2011
EP     2634743 A1   9/2013
(Continued)

OTHER PUBLICATIONS

Bilen, Tugce et al. "Aeronautical Networks for In-Flight Connectivity: A Tutorial of the State-of-the-Art and Survey of Research Challenges", IEEE Access, vol. 10, Feb. 25, 2022 (Feb. 25, 2022), pp. 20053-20079, XP093080615, Retrieved from the Internet: https://ieeexplore.ieee.org/ielx7/6287639/9668973/09714288.pdf?tp=&arnumber=9714288&isnumber=9668973&ref=aHR0cHM6Ly9pZWVleHBsb3JlLmllZWUub3JnL2RvY3VtZW50Lzk3MTQyODg=>.

(Continued)

*Primary Examiner* — Joshua D Taylor
(74) *Attorney, Agent, or Firm* — Perkins Coie LLP

(57)     ABSTRACT

A method for providing video programs for passengers on commercial passenger vehicles is provided. The method includes obtaining satellite beam coverage information indicative of beam coverages of one or more commercial passenger vehicles by one or more satellites; checking subscription information corresponding to a subset of commercial passenger vehicles in a beam coverage area of a particular satellite beam; generating, based on a result of the checking, a video program package including one or more video programs subscribed by the subset of commercial passenger vehicles; and transmitting the video program package to a satellite providing the particular satellite beam such that the one or more video programs of the video program package are transmitted through the particular satellite beam to the subset of commercial passenger vehicles.

18 Claims, 18 Drawing Sheets

(51) Int. Cl.
    *H04N 21/2665*     (2011.01)
    *H04N 21/61*      (2011.01)

(56)         References Cited

FOREIGN PATENT DOCUMENTS

| EP | 4462792 A2 | 11/2024 |
|----|------------|---------|
| WO | 2022060357 A1 | 3/2022 |
| WO | 2022075980 A1 | 4/2022 |

OTHER PUBLICATIONS

Extended European Search Report issued in European Patent Application No. 24175201.3 issued Oct. 25, 2024 (12 pages).

\* cited by examiner

800

Determining, based on passenger requests, to reorganize a video program package
810

Reorganizing video program package
820

900

Detecting a movement of one or more commercial passenger vehicles
in a coverage area of a particular satellite beam
910

Modifying a video program package
920

| Scenario | Beam 1 | | | | Beam 2 | | | | Beam 3 | | | | ⋯ | | | | Beam N | | | |
|---|---|---|---|---|---|---|---|---|---|---|---|---|---|---|---|---|---|---|---|---|
| Live TV/Movie CH | 1 | 2 | 3 | M | 1 | 2 | 3 | M | 1 | 2 | 3 | M | 1 | 2 | 3 | M | 1 | 2 | 3 | M |
| SC1 | X | O | X | O | X | O | X | O | O | X | O | X | ⋮ | ⋮ | ⋮ | ⋮ | O | X | X | O |
| SC2 | X | X | X | X | X | X | X | X | X | X | X | X | ⋮ | ⋮ | ⋮ | ⋮ | X | X | X | X |
| SC3 | X | X | X | O | X | O | X | X | X | O | X | X | ⋮ | ⋮ | ⋮ | ⋮ | O | X | X | X |
| ⋮ | | | | | | | | | | | | | | | | | | | | |
| SCN | O | O | X | O | O | O | X | O | O | | X | O | ⋮ | ⋮ | ⋮ | ⋮ | X | O | O | O |

FIG. 11

| Scenario | Beam 11 | | | | Beam 12 | | | | Beam 13 | | | | ... | | | | Beam 1N | | | |
|---|---|---|---|---|---|---|---|---|---|---|---|---|---|---|---|---|---|---|---|---|
| Live TV/Movie CH | 1 | 2 | 3 | M | 1 | 2 | 3 | M | 1 | 2 | 3 | M | 1 | 2 | 3 | M | 1 | 2 | 3 | M |
| SC11 | X | O | X | O | X | O | X | O | O | X | O | X | ⋮ | ⋮ | ⋮ | ⋮ | O | X | X | O |
| SC22 | X | X | X | X | X | X | X | X | X | X | X | X | ⋮ | ⋮ | ⋮ | ⋮ | X | X | X | X |
| SC33 | X | X | X | O | X | O | X | X | X | O | X | X | ⋮ | ⋮ | ⋮ | ⋮ | O | X | X | X |
| ... | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ |
| SCNN | O | O | X | O | O | O | X | O | O | X | X | O | ⋮ | ⋮ | ⋮ | ⋮ | X | O | O | O |

FIG. 13

TECHNIQUES FOR PROVIDING VIDEO PROGRAMS FOR PASSENGERS ON COMMERCIAL PASSENGER VEHICLES

TECHNICAL FIELD

This document is generally related to systems, methods, and apparatus to improve passenger experiences for passengers in commercial passenger vehicles such as airplanes, passenger trains, buses, cruise ships, and other forms of transportation.

BACKGROUND

Commercial travel has evolved with the increasing popularity of personal electronic devices (PEDs) that passengers carry on board, as well as media play devices provided in commercial passenger vehicles. Techniques that provide passengers in commercial passenger vehicles access to a large variety of entertainment content with minimal or no disruption will enhance a positive travel experience.

SUMMARY

This patent document describes, among other things, various implementations for providing video streaming services for passengers on commercial passenger vehicles.

In one aspect, a method for providing video programs for passengers on commercial passenger vehicles is provided. The method includes obtaining satellite beam coverage information indicative of beam coverages of one or more commercial passenger vehicles by one or more satellites; checking subscription information corresponding to a subset of commercial passenger vehicles in a beam coverage area of a particular satellite beam; generating, based on a result of the checking, a video program package including one or more video programs subscribed by the subset of commercial passenger vehicles; and transmitting the video program package to a satellite providing the particular satellite beam such that the one or more video programs of the video program package are transmitted through the particular satellite beam to the subset of commercial passenger vehicles.

In another aspect, a method for providing entertainment content to subscribers in a commercial passenger vehicle is provided. The method comprises: detecting, by a ground-based server, a movement of one or more commercial passenger vehicles in a coverage area of a particular satellite beam; and modifying a video program package based on the detecting such that a first video program is deactivated from the video program package due to a first aircraft leaving the coverage area, or a second video program is activated in the video program package due to a second aircraft entering the coverage area.

In another aspect, a system for providing video programs for passengers on commercial passenger vehicles is provided. The system comprises: a storage configured to store subscription information indicative one or more video programs subscribed by each of the commercial passenger vehicles; and a server disposed outside the commercial passenger vehicle and in communication with the storage, the commercial passenger vehicles, and one or more satellites providing corresponding beam coverage areas. The server is configured to obtain satellite beam coverage information indicative of beam coverages of one or more commercial passenger vehicles and transmit a video program package including one or more video programs selected based on subscription information corresponding to a subset of commercial passenger vehicles in a beam coverage area of a particular satellite beam.

In another aspect, a computer readable medium is provided. The computer readable medium stores instructions, upon execution by a processor, causing the processor to implement a method comprising:

The above and other aspects and their implementations are described in greater detail in the drawings, the description, and the claims.

BRIEF DESCRIPTION OF THE DRAWINGS

FIG. 11 shows an example of a table that illustrates various scenarios showing how beams are used for providing TV services for an aircraft based on some implementations of the disclosed technology.

FIG. 13 shows an example of a table that illustrates various scenarios showing how beams are used for providing TV services for an aircraft.

DETAILED DESCRIPTION

Figure 1:
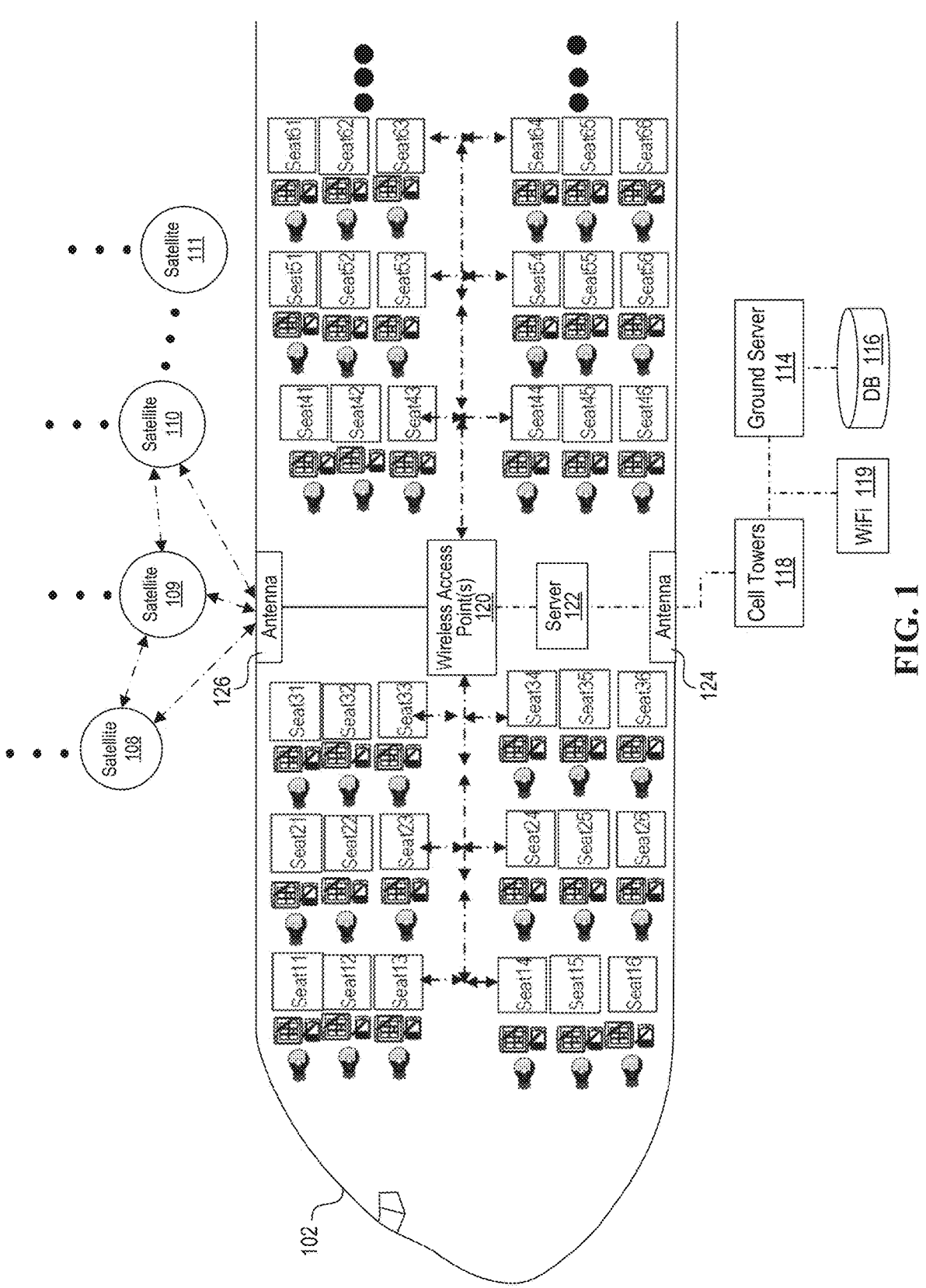
FIG. 1 shows an example of an in-flight entertainment (IFE) system installed in an airplane based on some implementations of the disclosed technology.

In-flight Connectivity (IFC) market have been going through major changes, which directly impact an end customer inflight experience, airliners offering and differentiation, service provider, and satellite network provider. Some of the changes are linked to the emergence of Low Earth Orbit (LEO) satellite networks. When compared to Geostationary Earth Satellite (GEO) and medium earth orbit (MEO) satellite, LEO network offers higher transmission rate and low latency, which may translate to superior user experience that is closer to the experience at home. Because of operational requirements, it's important to deliver the inflight connectivity in a single orbit system including LEO, MEO, or GEO satellite network and a multi orbit system including at least two of LEO, MEO, and GEO satellite networks.

In addition to the changes in the global connectivity services, with the recent advances in digital video, computer and display technologies, a great number of entertainment options are being offered to passengers traveling in a commercial vehicle. For example, airlines often offer tens or hundreds of video programs to passengers for passenger enjoyment during the time they stay in the vehicle. Movies or other stored video programs are selectable by passenger on seats in the vehicle. In addition to prerecorded video entertainment content, live video programs are also available for passengers during the trip based on the global connectivity services using satellite networks. Such entertainment options for selecting various video programs can help the passengers to more enjoy the travel and increase a passenger experience. In providing the video programs to passengers in the vehicle, however, there have been some degradation issues of video streaming qualities.

The degradation issues can occur, for example, when there are too many requests from multiple passengers on a passenger vehicle for a specific video program from passengers. The degradation issues of video streaming qualities include lagging, freezing, or skipping of video being displayed on devices, and/or a low resolution in displaying the video on devices. In some cases, the degradation issues can result in losing a portion of the video session or in recurring glitches/freezes in the video display. In some other cases, a video session being watched by the passenger can be unintentionally and randomly terminated because of insufficient resources support the video session. In any event, the streaming qualities in providing video programs can decrease, which significantly degrades the passenger experiences. The degradation issues can be frustrating and leave passengers with a negative passenger experience and a negative impression on a commercial passenger vehicle.

To address the degradation of the video streaming qualities and offer a reliable video streaming service, several solutions are currently implemented in the art, which include monitoring the performance of video streaming services and adjusting a network parameter to improve the performance of the video streaming services. Since the video streaming quality is subjective and hard to measure and evaluate, the poor quality of the video streaming services is usually learned by the morning after such issue gets reported by a passenger. To monitor the performance of the video streaming services, dashboards are currently used.

While various studies are being conducted on the global traffic, with enough capacity on LEO networks, the question often asked is why video streaming service is offered instead of just allowing everyone to stream any programs. This question goes back to how content is licensed and the availability of the content. For example, a certain sport program can carry all the sporting rights because that sport program is only allowed inflight internationally between different countries, so it does not compete with other right holders in different territories on the ground. Same applies to other streaming providers with different content. For example, a same streaming service account loads different content based on the territory in which it's being used due to the content rights in that specific territory. An aircraft flying anywhere will appear to be in the territory of the traffic egress point which could mean facilitating showing content that should not be legally consumable where the aircraft is flying. In another aspect, how to distribute the TV programs needs to be further studied. There are limited radio resources available for providing the video streaming services for passengers on commercial passenger vehicles. While satellite beams are expensive radio resources, how to consume the satellite beams in providing the video streaming services is to be discussed.

The technical solutions described in the present document can be embodied in implementations to improve a passenger experience among other features by providing improved techniques for providing video programs for passengers in commercial passenger vehicles. With various examples of the disclosed technology, it is possible to provide video streaming services to passengers during travel in a more reliable and efficient manner, which can increase passenger experience while they stay in the vehicle. Some implementations of the disclosed technology provide suggesting an efficient use of bandwidths of satellite beams based on satellite beam coverage information and subscription information of commercial passenger vehicles. Some implementations of the disclosed technology implement solutions that reduce bandwidths being wasted and optimizes the use of bandwidths for providing video programs for passengers in a commercial passenger vehicle.

Various implementations will be discussed in detail with reference to the figures below. In the description, an airplane is described as an example of the passenger vehicle, but the implementations of the disclosed technology can be applicable to other passenger vehicles such as buses, trains, ships, and other types of commercial passenger vehicles.

FIG. 1 shows an example of an in-flight entertainment (IFE) system for passengers in a commercial passenger vehicle such as an airplane. The example diagram of the in-flight system as shown in FIG. 1 is provided to explain how wireless connections are supported in the airplane 102. The components shown as a single element in FIG. 1, e.g., the server 122, the database 116, the wireless access point 120, etc. can be configured in multiple elements. For example, the in-flight service system can include multiple wireless access points to facilitate or support providing of wireless coverages for the passengers.

The IFE system provides various entertainment and connectivity services to passengers on board. Referring to FIG. 1, the IFE system includes a server 122, antenna 126, and antenna 124. The passengers carry their own devices, which include the PEDs (illustrated by the light bulb icon in FIG. 1) and other wireless electronic devices. The PEDs may refer to any electronic computing device that includes one or more processors or circuitries for implementing the functions related to data storage, video and audio streaming, wired communications, wireless communications, etc. The examples of the PEDs include cellular phones, smart phones, tablet computers, laptop computers, and other portable computing devices. In the implementations of the disclosed technology, the PEDs may have the capability to execute application software programs ("apps") to perform various functions.

In FIG. 1, the airplane 102 is depicted to include multiple passenger seats, Seat 11 to Seat 66. The example diagram as shown in FIG. 1 shows the economy seats only but different types of passenger seats (e.g., premium economy class, premium class, first class, etc.) can be further provided in the airplane 102. The media playback devices (illustrated by screen icon) are provided at each passenger seat and configured with capabilities for video and audio streaming, Internet communications, and other capabilities. In some implementations, the media playback devices are provided at each passenger seat, such as located at each of the seatbacks of the passenger seats, and/or on cabin walls and/or deployable from an armrest for seats located at a bulkhead (i.e., in the first row of a section). The media playback devices have displays providing interfaces to each passenger through which each passenger enters their selections on the entertainment option, for example, a selection to watch a video program, a selection of a particular video program to watch, etc. The media playback devices can also allow each passenger to enter the selections of wireless network option, emergency requests, etc. To facilitate communications with the passengers, various graphic user interface (GUI) functions can be suggested and displayed on the media playback devices.

In some implementations, the media playback devices, the server 122, and the PEDs may be in communication through wired connections or wireless connections. In some implementations, the communication among the server 122, the media playback devices, and the PEDs are achieved through the antenna 124 to and from the ground-based cell towers 118 by, for example, a provision of network plugs at the seat for plugging PEDs to a wired onboard local area network. In some other implementations, the communications among the server 122, the media playback devices, and the PEDs are achieved through the antenna 126 to and from satellites 108, 109, 110, 111 in an orbit (e.g., via a cellular network utilizing one or more onboard base station(s), Wi-Fi utilizing the wireless access point 120, and/or Bluetooth). For example, the wireless network utilizing the wireless module of the media playback devices, and/or the wireless access point 120 can be formed among the server 122, the media playback devices, and the PEDs and allow the communication therebetween.

The server 122 is communicably coupled with media playback devices and the PEDs and configured to perform various operations including processing requests/inputs from passengers and providing data to passengers. In some implementations, the server 122 may communicate with other systems, for example, the ground server 114, the database 116, and the gate terminal (not shown), which are located outside of the airplane 102. The server 122 can communicate with the systems on ground such as the ground server 114, the database 116, and the gate terminal via the antenna 124 for receiving and transmitting information from/to the other systems. As further discussed later in this patent document, in the implementations of the disclosed technology, the ground server 114 operates to control the video streaming services by generating video program package containing one or more video programs and transmitting the generated video program package to satellites such that the satellites transmit the video program package to the aircrafts through satellite beams.

In some examples, cell towers 118 communicate or interface with the antenna 124 of the airplane 102, such that ground systems such as the ground server 114, the database 116, and the gate terminal can transmit and receive data with the server 122 and other in-vehicle systems. In some implementations, Wi-Fi element 119 provides a wireless local area network (WLAN) to allow the server 122 to communicate with the ground systems. Thus, the cell tower 118 and the Wi-Fi element 119 may act as communication nodes between the antenna 124 of the airplane 102 and the ground systems such as the ground server 114, the databases 116, and the ground terminal. In some implementations, the server 122 implements a router for the wireless onboard networks and various functionality disclosed herein to provide video streaming services for passengers in the airplane 102. The gate terminal can be implemented as a computing device and operate to maximize efficiency and safety of passenger transfers and aircraft servicing. The ground server 114 and the gate terminal may be in communication with the database 116 and provide information from the database 116 to the server 122 and store information received from the server 122 in the database 116. Although FIG. 1 shows that the database 116 is provided separately from the ground server 114, the database 116 can be provided as a part of the ground server 114. The gate terminal may be in communication with the ground server 114 and the database 116.

Although not shown in FIG. 1, the IFE system may further include a database which stores passenger information, for example, profiles of the passengers (name, age, etc.), preferred entertainment options (movies, music, shows, etc.), preferred entertainment content (e.g., genres of movies), etc. The passenger information can be obtained in multiple manners and stored in the database of the IFE system. In some implementations, the passenger information is obtained prior to the passengers coming on board (e.g., at the time of purchasing the tickets or checking in for the flights), or at other times. In some implementations, the passenger information can be obtained and shared by an association of several airplane companies and retrieved from the database 116. In some implementations, the passenger information can be updated during the trip.

Figure 2:
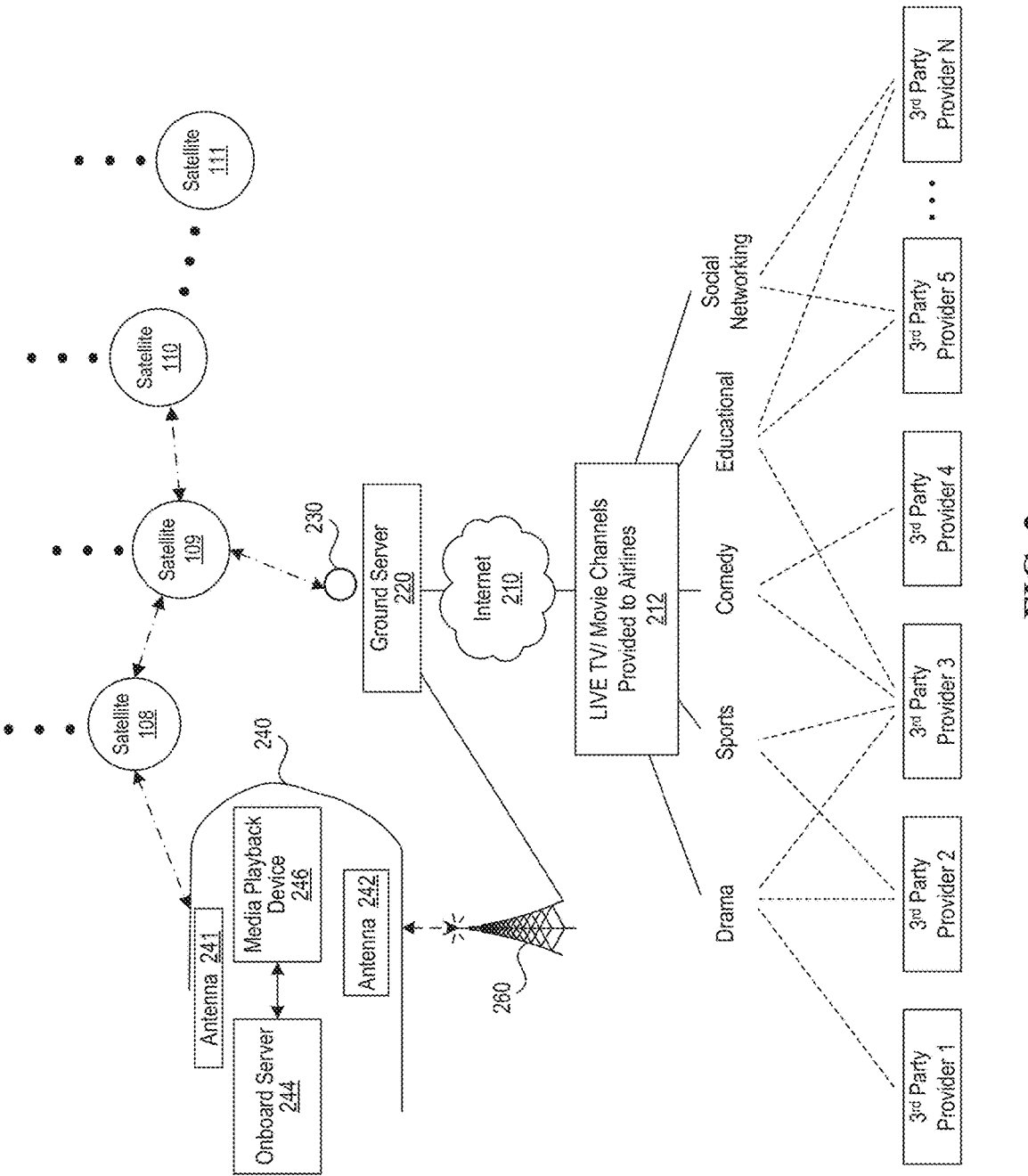
FIG. 2 shows an example of a configuration including a system for providing video programs based on some implementations of the disclosed technology.

FIG. 2 shows an example of a configuration including a system for providing video streaming services based on some implementations of the disclosed technology. In the example system of FIG. 2, some elements of the aircraft 240 are shown, which include antennas 241 and 242, a media playback device 246, and an onboard server 244 in communication with the media playback device 246. The aircraft 240 is in communication with a ground server 220 through antennas 241 and 242 via one or more satellites 108, 109, 110, and 111 and/or a terrestrial communication station 260.

The antennas 241 and 242 maybe sized and shaped to fit within the space specified by the relevant standard. For communication with geostationary satellites and providing a satisfactory communication experience for passengers on the aircraft 240, the antenna needs to satisfy certain characters related to antenna performance. For example, G/T is a factor typically used for characterizing antenna performance, where G the antenna gain in decibels in a receive frequency band, and T is the equivalent noise temperature in Kelvins. For example, the antennas 241 and 242 may be configured to provide a certain range of G/T depending on area features during a travel of the aircraft 240. The G/T values are simply provided as examples and are not to be construed as limiting the various adaptive aspects described herein. In some implementations, a ground server antenna 230 can be provided to provide the connected network among the ground server 220, the aircraft 240, and the satellites 108, 109, 110, and 111. The ground server antenna 230 is the example only and other implementations are also possible. In some implementations, a wireless router such as an Internet modem can be configured to support the communication between the ground server 220 and the aircraft 240. In some implementations, a teleport can be configured to support the communication between the ground server 220 and the satellites 108, 109, 110, and 111.

In some implementations, the ground server 220, which in communication with aircrafts including the aircraft 240 and satellites 108, 109, 110, and 111, is configured to control the in-flight video streaming services based on subscription information and beam coverage information of aircrafts. The ground server 220 establishes the communication connections with the satellites 108, 109, 110, 111 via a teleport (not shown). With the communication connections with the satellites, the ground server 220 transmits, to the satellites, the video program packages, each containing one or more video programs. The satellites transmit the video program packages to the aircrafts through corresponding beams such that the one or more video programs included in the video program packages are provided to passengers in the aircrafts.

The ground server 220 communicably coupled to the Internet 250 retrieves video content such as live TV/movie channels, which are to be transmitted from the ground server 220 to the satellites and then to the aircrafts. The Internet 250 is the example only and other communication protocols can be used to enable the communications between the ground server 220 and additional servers/platforms. As shown in FIG. 2, the video content data includes various genres and/or types of video programs, e.g., drama, sports, comedy, educational, or social networking. Each airline subscribes one or more video programs through 3$^{rd}$ party providers (e.g., 3$^{rd}$ party provider 1, 3$^{rd}$ party provider 2, . . . , 3$^{rd}$ party provider N) and offer the subscribed video programs their passengers on board. Each airline determines which video programs are to be offered for each trip of a particular aircraft and such information is referred to as subscription information of an aircraft. In the implementations, the subscription information indicates which aircraft subscribes which video programs. The subscription information can be stored in a ground database (e.g., database 116 as shown in FIG. 1) and utilized by the ground server 220 to generate the video program packages for providing the in-flight video streaming services. Thus, the video program packages may be considered as the video program packages, each package including one or more video programs, which are curated based on the subscription information and the beam coverage information of corresponding aircrafts.

In some implementations, the beam coverage information is obtained by the ground server 220, which indicates satellite beams having the coverages corresponding to areas where the aircrafts are flying. Each of satellite beam coverage areas represent geographical areas for which the satellite beams provide the communication connections to the aircrafts. The beam coverage information can be obtained various manners. In some implementations, the beam coverage information can be provided from the aircraft 240 to the ground server 220. In some implementations, the onboard server 244 has satellite map information containing a list of satellite beams and other information relating to data connections with the beams and shows which satellite beams cover which locations and the desirability of each satellite beam in each location. The onboard server selects a beam with a high, or the highest, weighted value of the various available satellite beams based on the satellite map information and provides the beam coverage information to the ground server 220. In some implementations, the ground server 220 may store the satellite map information and monitor the geographical location of the aircraft 240. In some implementations, the ground server 220 may obtain the beam coverage information based on the monitoring. In some implementations, the beam coverage information includes a satellite coverage map of one or more satellites, each providing one or more beams.

Although not shown, the machine learning/artificial intelligence (AI) module may be employed to cooperate with the ground server 220 to assist the operations of the ground server. In some implementations, the machine learning/AI module can provide various servers/platforms operating as sources of various data that is related to a travel by a commercial passenger vehicle and provide any related information such as weather reports, fleet information, aircraft information, etc., to the ground server 220 (and/or the machine learning/AI module). Such data can be utilized by the ground server 220 (and/or the machine learning/AI module) to perform the control of the video streaming services. The machine learning/AI module can be implemented outside of the ground server 220 or the ground server 220. The machine learning/AI module includes machine learning applications that perform various types of data analysis to automate analytical model building. Using algorithms that iteratively learn from data, machine learning applications can enable computers to learn without being explicitly programmed. The machine learning/AI module may be configured to use data learning algorithms to build models to interpret various data received from the various devices or components to detect, classify, and/or predict future outcomes. Such data learning algorithms may be associated with rule learning, artificial neural networks, inductive logic programming, and/or clustering. The machine learning/AI module may compile coded descriptions into lower-level structured data objects that a machine can more readily understand, build a network topology of the main problem concept and sub-concepts covering aspects of the problem to be solved, train codified instantiations of the sub-concepts and main concept, and execute a trained AI model containing one, two, or more neural networks. The machine learning/AI module can abstract away and automate the low-level mechanics of AI, and the machine learning/AI module can manage and automate much of the lower-level complexities of working with AI. Each program developed in a pedagogical programming language can be fed into the machine learning/AI module to generate and train appropriate intelligence models. The machine learning/AI module can be a cloud-hosted platform configured to manage complexities inherent to training AI networks. Thus, the machine learning/AI module can be accessible with one or more client-side interfaces to allow third parties to submit a description of a problem in a pedagogical programming language and let the online AI engine build and generate a trained intelligence model for one or more of the third parties. In some embodiments, the machine learning/AI module employs algorithms to predict a next beam to be used by a particular airplane during a travel by a commercial passenger vehicle based on various information. In some implementations, the machine learning/AI module may suggest recommendations for beam/satellite usages to improve the efficiency in providing video streaming services. For example, the machine learning/AI module can map or chart patterns of satellite usage and select a different satellite for more efficient video streaming services for trips in future.

The ground server 220 can be configured to use a wide variety of resources including compute resources, storage resources, and other resources and control video streaming services using various algorithms. While FIG. 2 shows the implementation that the system is configured as the ground server 220, other implementations are also possible. For example, the video streaming system can be configured in a cloud. In this case, the cloud platform for controlling the video streaming services exists with servers, processes, and databases, which are able to be connected connect over a wide area network, such as the Internet, from multiple computing devices and then the backend of the cloud platform is configured to handle the operations of the video streaming system including operations discussed above for the ground server 220 in FIG. 2, by dynamically calling in additional computing hardware machines to load on and run the independent processes as needed.

Figure 3:
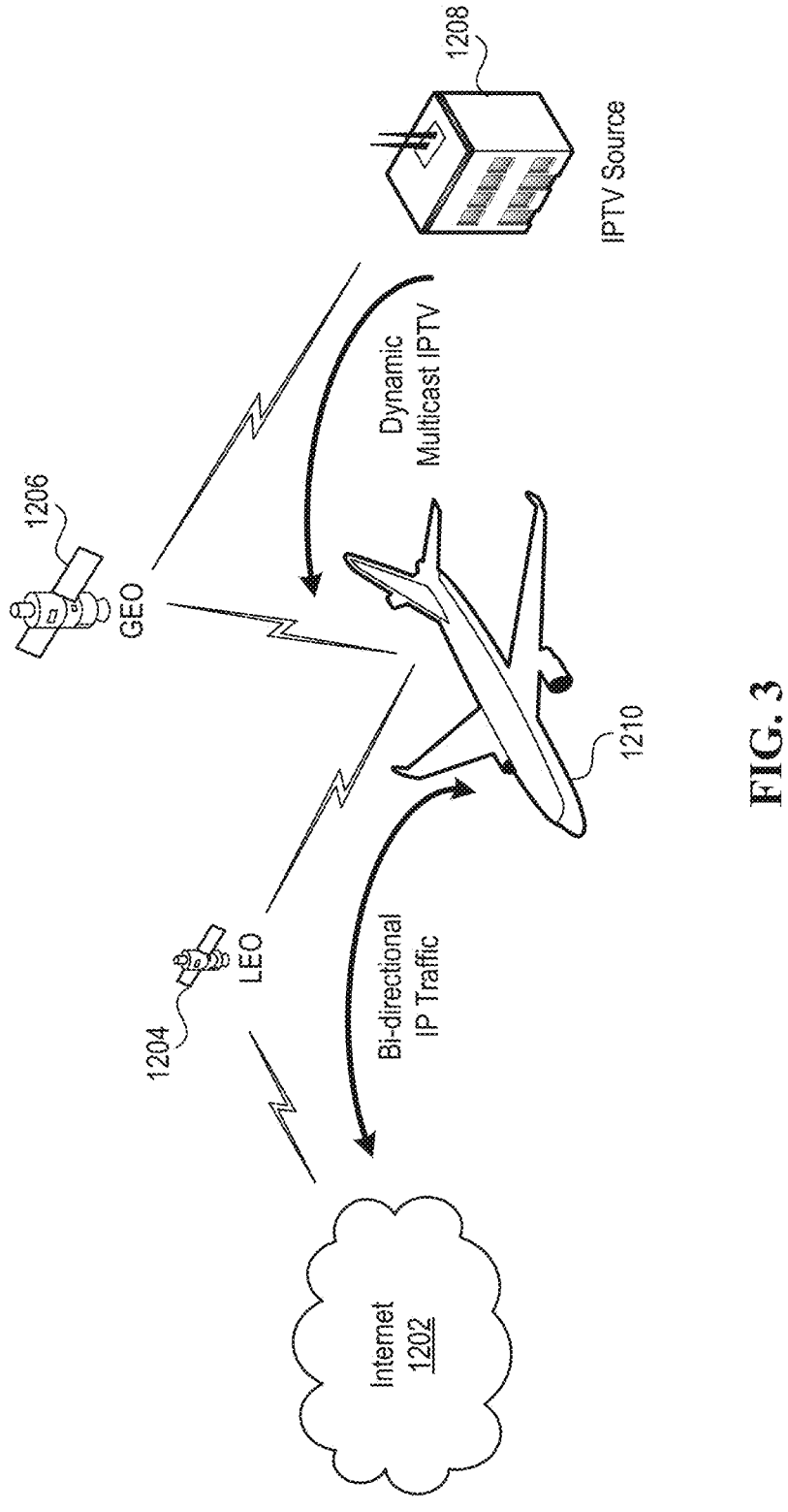
FIG. 3 shows an example of a diagram illustrating how wireless data services including video streaming services are provided to an aircraft based on some implementations of the disclosed technology.

FIG. 3 shows an example of a diagram illustrating how wireless data services including video streaming services are provided to an aircraft based on some implementations of the disclosed technology. The implementations of the disclosed technology can be applied to both a single orbit system and a multi orbit system. Satellites are categorized as one of sets of satellites, e.g., GEO, LEO, or MEO, based on distances from the earth. The single orbit system refers to a system where a single set of satellites is utilized for providing wireless data services and the multi orbit system refers to a system at least two different sets of satellites are utilized for providing wireless data services. In the multi orbit system, one set of satellites is placed closer to the earth as compared to another set of satellites. In the example of FIG. 3, the airplane 1210 is provided with wireless data services from the multi orbit system including both a Low Earth Orbit (LEO) satellite 1204 and a Geostationary Earth Orbit (GEO) satellite 1206 that are utilized for providing wireless data services. GEO satellites (e.g., the GEO satellite 1206) appear to be motionless in the sky, providing the satellite with a continuous view of a given area on the surface of the Earth. Such an orbit can only be obtained by placing the satellite directly above the Earth's equator (0° latitude), with a period equal to the Earth's rotational period. LEO satellites (e.g., the LEO satellite 1204) are placed in circular orbits at low altitudes of less than 2,000 km. A constellation of LEO satellites can provide continuous world-wide coverages, but this requires many satellites as each one is over a given region for a relatively small amount of time. Because of their relative lower distance to the Earth, latency, the delay caused by the distance a signal must travel, is far less than all other orbits.

Types of the wireless data services that can be provided to the airplane 1210 are based on a terminal capability, e.g., whether the airplane 1210 has a dual channel transceiver or not. In some implementations, the airplane 1210 may have a single channel transceiver and thus can receive signals from the LEO or the GEO but not simultaneously. In some implementations including the example as shown in FIG. 3, the airplane 1210 has a dual channel transceiver and thus can receive the signals from the LEO and the GEO simultaneously.

In the example as shown in FIG. 3, the bi-directional IP traffic is established between the airplane 1210 and the Internet through the LEO satellite 1204 and the TV streams (e.g., live TV/movies) are provided from an Internet protocol TV (IPTV) source 1208 through the GEO satellite 1206.

According to some implementations of the disclosed technology, the video streaming services are provided in the airplane 1210 simultaneously from the GEO network and the LEO network or only from the GEO network or LEO network. As discussed in relation to FIG. 2, in some implementations of the disclosed technology, the ground server is in communication with the airplane 1210, the LEO satellite 1204 and the GEO satellite 1206 and control the video streaming services provided through a corresponding satellite.

While FIG. 3 shows the LEO satellite 1204 and GEO satellite 1206 as an example, the video streaming services can be provided using other satellites than the LEO satellite 1204 and GEO satellite 1206. For example, a medium earth orbit (MEO) satellite can be utilized to provide the video streaming services. MEO satellites are located at any altitude between those of the LEO satellite and the GEO satellite and can cover relatively large areas. For example, MEO satellites provide continuous coverage between approximately 70° N Latitude and 70° S Latitude for terrestrial-based mission platforms.

Figure 4:
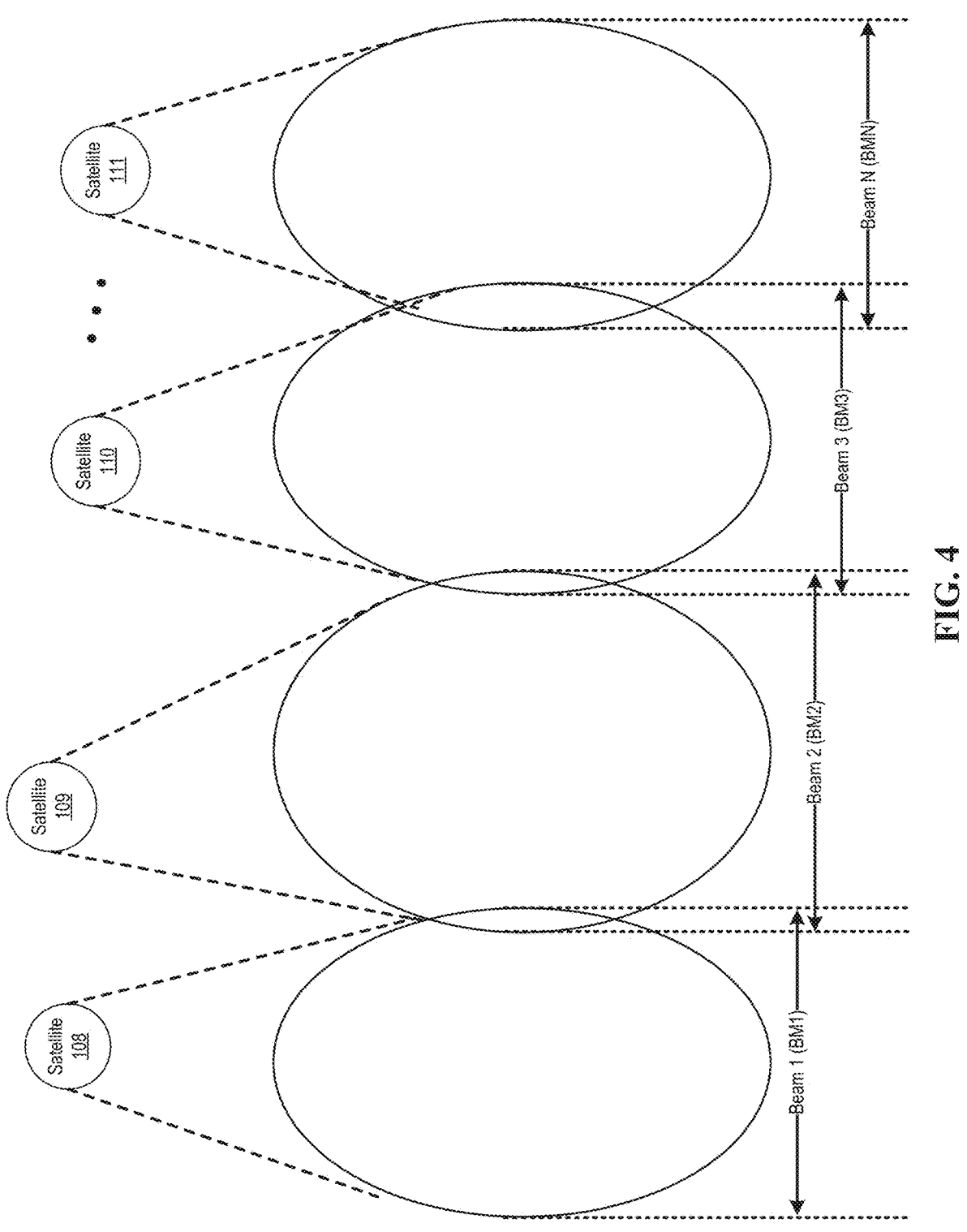
FIGS. 4 to 6 show examples of beams providing video programs for passengers in aircrafts based on some implementations of the disclosed technology.
Figure 5:
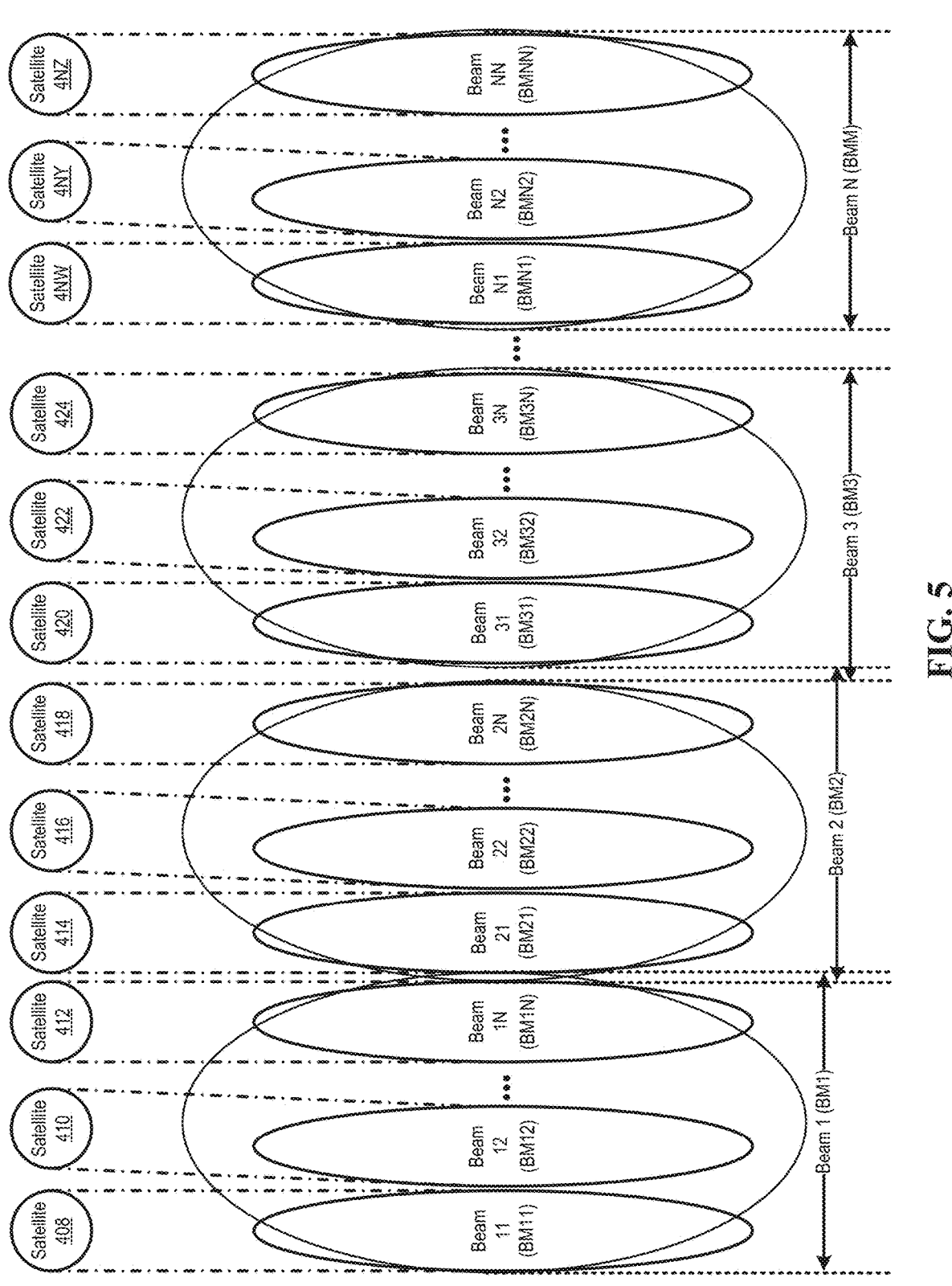
Figure 6:
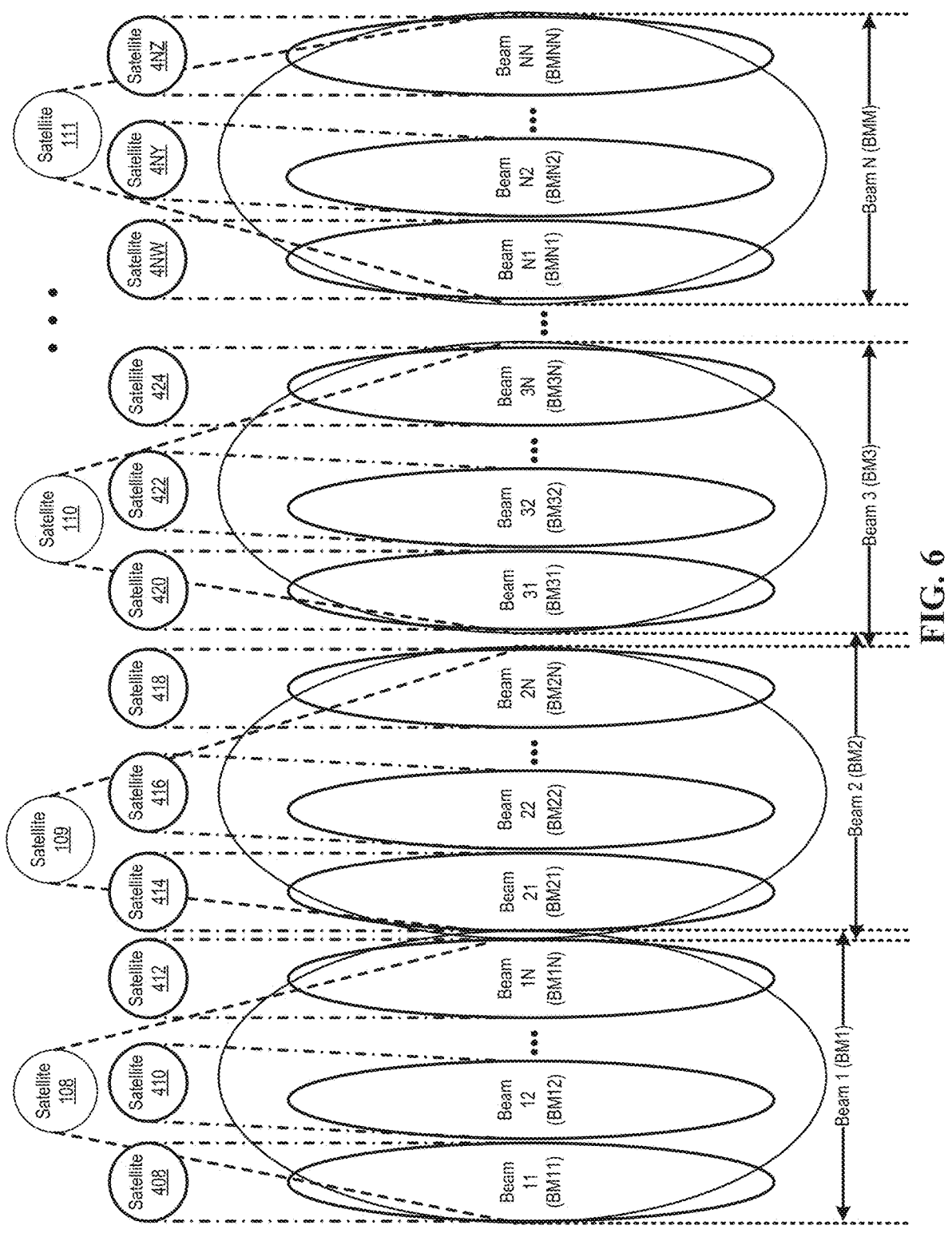
Figure 18:
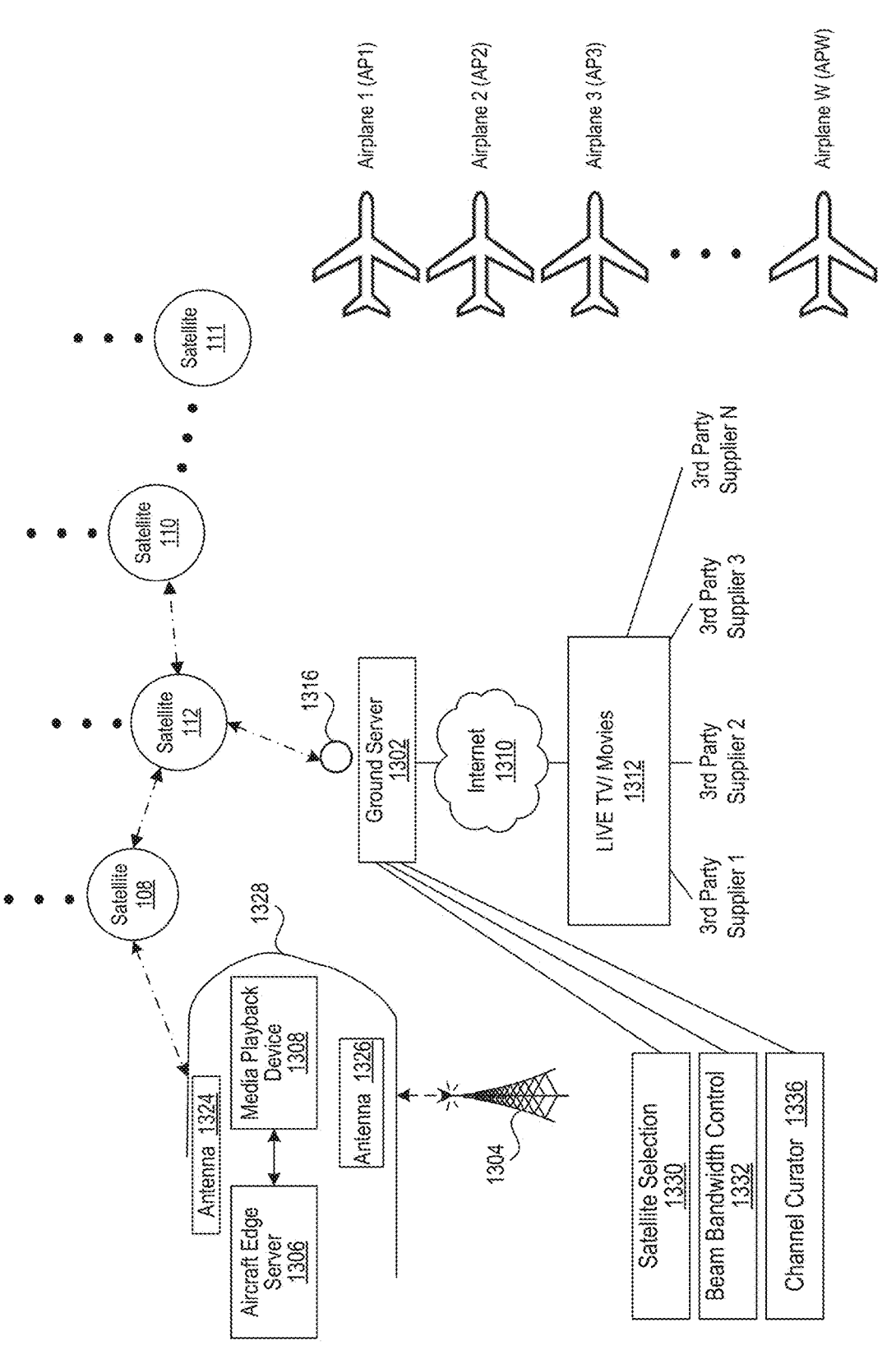
FIG. 18 shows an example of a configuration including a ground server and multiple aircrafts based on some implementations of the disclosed technology.

FIGS. 4 to 6 show examples of satellite beams providing video programs for passengers in aircrafts based on some implementations of the disclosed technology. The beam coverage areas represent geographical areas for which the satellite beams provide the communication connections providing video streaming services to aircrafts (for example, each of Airplane 1 to Airplane W as shown in FIG. 18). FIGS. 4 to 6 illustrate that some satellite beam coverage zones overlap. The overlapping regions may provide opportunities for transitioning aircrafts away from satellites.

FIG. 4 shows Beam 1 (BM 1), Beam 2 (BM 2), Beam 3 (BM3) . . . Beam N (BMN), which are provided by satellites 108, 109, 110 . . . 111, respectively. FIG. 5 show Beam 11 (BM11), Beam 12 (BM12) . . . Beam 1N (BMIN), which are provided by satellites 408, 410 . . . 412, respectively, Beam 21 (BM21), Beam 22 (BM22) . . . Beam 2N (BM2N), which are provided by satellites 414, 416 . . . 418, respectively, Beam 31 (BM31), Beam 32 (BM32) . . . . Beam 3N (BM3N), which are provided by satellites 420, 422 . . . 424, respectively, and Beam N1 (BMN1), Beam N2 (BMN2) . . . Beam NN (BMNN), which are provided by satellites 4NW, 4NY . . . 4NZ, respectively. In the example, the satellites 108, 109, 110, 111 correspond to the GEO satellites. In this case, the example of FIG. 4 illustrates a scenario that the wireless data connection services including video streaming services are provided from the GEO network. In the example, the satellites 408, 410, 412, 414, 416, 418, 420, 422, 424, 4NW, 4NY, 4NZ correspond to the LEO satellites. In this case, the example of FIG. 4 illustrates a scenario that the wireless data connection services including video streaming services are provided from the LEO network. FIG. 6 shows an example of beams provided by the satellites 108, 109, 110, 111 and the satellites 408, 410, 412, 414, 416, 418, 420, 422, 424, 4NW, 4NY, 4NZ. The example of FIG. 6 illustrates a scenario of the co-existence of the GEO satellites and the LEO satellites. While FIGS. 4-6 show a number of beams and a number of the satellites, those numbers are example only and there can be more beams and satellites that operate to provide the video streaming services to the aircrafts.

Figure 7:
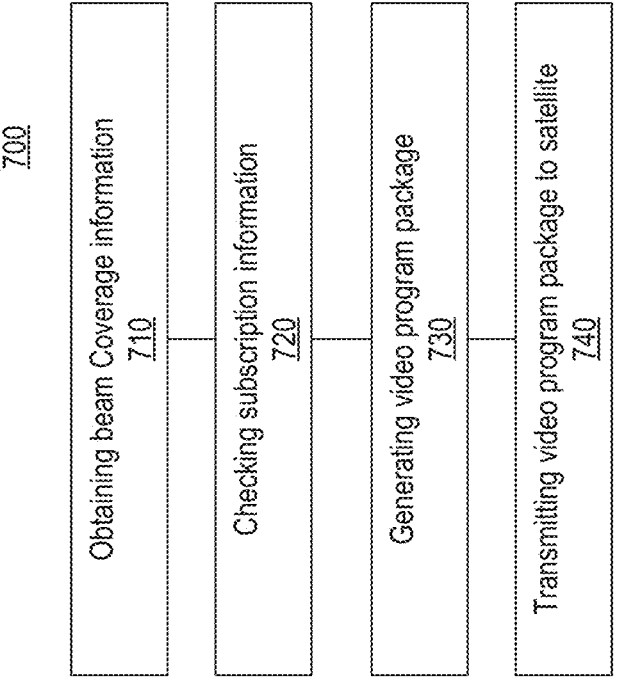
FIG. 7 shows an example of a method for providing in-flight video streaming services based on some implementations of the disclosed technology.

FIG. 7 shows an example of a method for providing in-flight video streaming services. In some implementations, the method 700 as shown in FIG. 7 may be performed by the ground server as shown in FIGS. 1 and 2. The ground server can control the in-flight video streaming services by transmitting, to a satellite providing a satellite beam, the video program package such that the video program packages are transmitted through the satellite beam to one or more aircrafts. The video streaming service may refer to providing the in-flight entertainment contents such as live TV, movies, etc., through satellite beams. When the in-flight entertainment contents are transmitted from the satellite to an aircraft, the video content may be provided to PEDs and media playback devices based on requests from passengers. The operations as shown in FIG. 7 can start after receiving a request for the video streamlining service from at least one passenger or can be performed without receiving the request. As to be discussed, the ground server may reorganize the video program package based on requests from passengers for the video streaming services.

At operation 710, the ground server obtains the beam coverage information indicating beam coverages of one or more aircrafts by one or more satellites. The ground server can obtain the beam coverage information in various manners. In some implementations, the onboard server of the aircraft provides the beam coverage information to the ground server. The ground server may receive the beam coverage information from multiple aircrafts. For example, when there are multiple aircrafts flying an area for which a particular satellite beam provides the coverage, the ground server can obtain the beam coverage information indicating the particular satellite beam providing the coverage corresponding to the area. In this case, the beam coverage information indicates the particular beam associated with the multiple aircrafts. In some implementations, the ground server monitors the geographical locations of the aircrafts and obtain the beam coverage information based on the monitoring. In some implementations, the beam coverage information may be obtained based on a satellite coverage map of one or more satellites, each providing one or more satellite beams.

At operation 720, the ground server checks subscription information corresponding to the aircrafts in a beam coverage area of a particular beam. The subscription information indicates subscribed video programs at a program level for each aircraft. As mentioned above, the subscription information indicating which aircraft subscribes which video programs can be stored in a ground database in communication with the ground server. The ground server may check the subscription information based on the beam coverage information. For example, when the ground server obtains the beam coverage information which indicates that aircrafts (e.g., Aircraft #1. Aircraft #2) are in the beam coverage area of the particular beam (e.g., Beam #A), the ground server checks subscription information corresponding to the aircrafts (e.g., Aircraft #1, Aircraft #2). As a result of checking, the ground server may obtain a list of video programs that are subscribed by the aircrafts (e.g., Aircraft #1, Aircraft #2) which are in the beam coverage area of the particular beam (e.g., Beam #A).

At operation 730, the ground server generates the video program package based on the subscription information. In some implementations, the ground server generates the video program package for the particular beam to include one or more subscribed video programs subscribed by the aircrafts in the beam coverage area of the particular beam. In some implementations, the video programs to be included in the video program package may be selected, based on requests from the passengers, among the subscribed video programs corresponding to aircrafts in the area corresponding to the particular beam. In the example, the video program package is curated to include all requested subscribed video programs requested by passengers in the aircrafts.

At operation 740, the ground server transmits the video program package, which is generated for the particular beam, to the satellite providing the particular beam. The transmitting of the video program package from the ground server to the satellite allows the satellite to transmit the video programs of the video program package through the particular beam to the aircrafts in the satellite coverage area of the particular beam. Thus, the one or more video programs included in the video program packages become available such that the passengers on the aircrafts flying on the satellite coverage area of the particular beam are provided with the one or more video programs.

Figure 8:
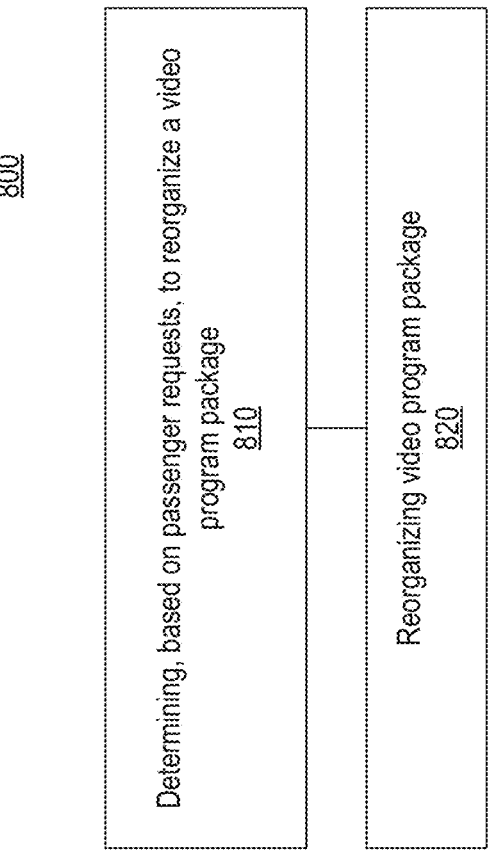
FIG. 8 shows an example of a method of reorganizing a video program package based on passenger requests based on some implementations of the disclosed technology.

Some implementations of the disclosed technology suggest reorganizing or modifying the video program package after the video program package is transmitted from the ground server to the satellite. FIG. 8 shows an example of a method reorganizing a video program package based on passenger requests for viewing subscribed video programs based on some implementations of the disclosed technology.

At operation 810, the ground server determines that the video program package needs to be change based on the change of video programs that are requested from passengers in the aircrafts flying in the satellite coverage area of the particular beam. In some implementations, the ground server may reorganize the video program package to omit a particular video program for which there are no requests from any passengers in the aircrafts flying in the satellite coverage area of the particular beam. In some implementations, the ground server may reorganize the video program package to include a particular video program that is newly requested by at least one passenger in the aircrafts flying in the satellite coverage area of the particular beam. With the reorganizing of the video program package, the ground server may manage and control the use of bandwidths of the particular beam. When the reorganizing of the video program package includes adding the particular video program to the video program package, the ground server may allocate a bandwidth freed up due to omitting the particular video program for other services than providing of the first video program. For example, the ground server can allocate the saved bandwidth for providing wireless network connection services (e.g., Wi-Fi services). In another example, the ground server can allocate the saved bandwidth to include an additional program to the video program package or spreading the bandwidths to other programs included in the video program package. When the reorganizing of the video program package includes adding the particular video program to the video program package, the ground server can allocate the bandwidth for providing the particular video program by taking away the bandwidth from other programs in the video program package or by deleting another program from the video program package.

Figure 9:
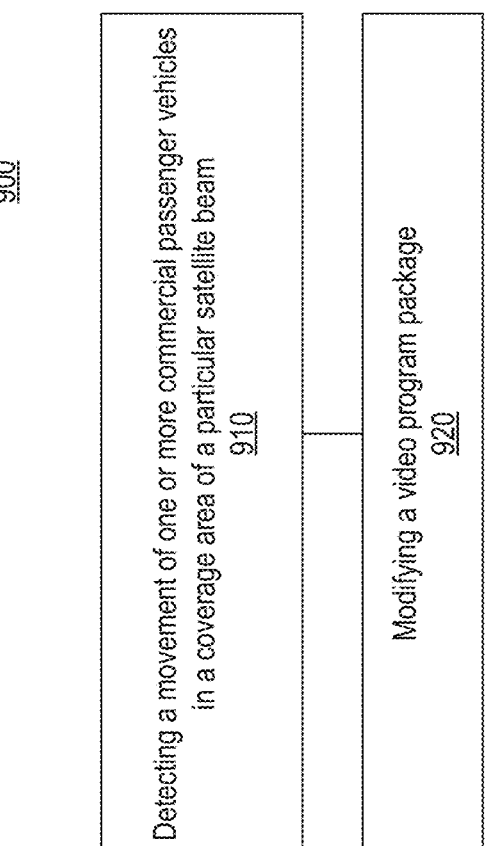
FIG. 9 shows an example of a method reorganizing a video program package based on a movement of one or more commercial passenger vehicles in a coverage area of a particular beam based on some implementations of the disclosed technology.

FIG. 9 shows an example of a method of modifying a video program package based on a movement of one or more commercial passenger vehicles in a coverage area of a particular beam based on some implementations of the disclosed technology.

At operation 910, the ground server may detect a movement of one or more commercial passenger vehicles in a coverage area of a particular satellite beam. At operation 920, the ground server may modify a video program package based on the detecting such that a first video program is deactivated from the video program package due to a first aircraft leaving the coverage area, or a second video program is activated in the video program package due to a second aircraft entering the coverage area. In the examples, a video program is activated when it is newly added to the video program package. In the examples, a video program is deactivated when it is removed from the video program package. In some implementations, the modifying of the video program package is performed based on whether there are any other aircraft to which a video program included in the video program package is being transmitted through the particular beam. In some implementations, the first video program is deactivated when there are no other aircrafts to which the first video program is being transmitted through the particular satellite beam. In some implementations, the second video program is activated when there are no other aircrafts to which the second video program is being transmitted through the particular satellite beam. In some implementations, the ground server may allocate a bandwidth freed up due to deactivating of the first video program for other services than providing of the first video program.

Figure 10:
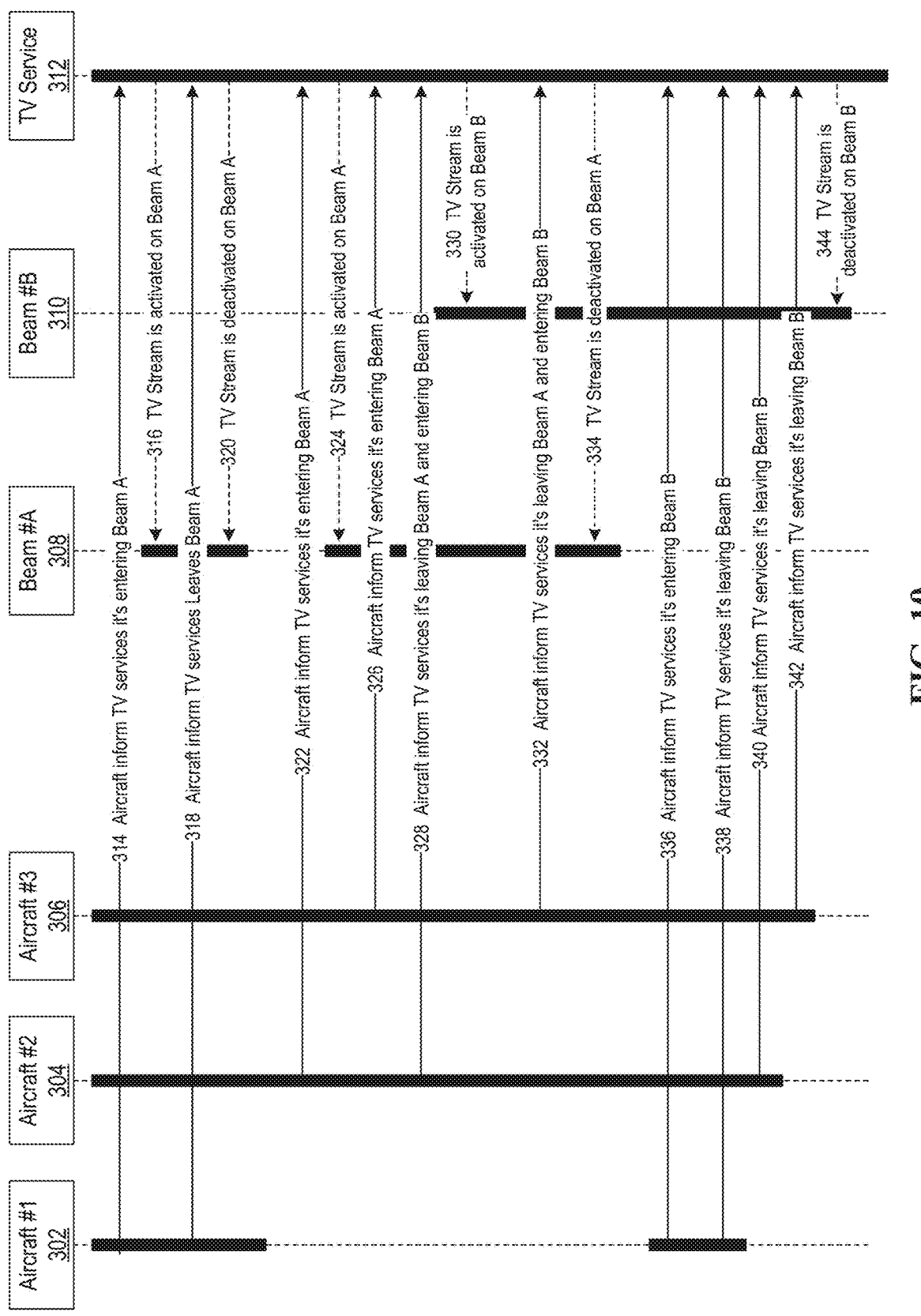
FIG. 10 shows an example of a method for providing in-flight video streaming services based on some implementations of the disclosed technology.

FIG. 10 shows an example of providing in-flight video streaming services based on some implementations of the disclosed technology. The method as shown in FIG. 10 may be referred to as a dynamic multicast approach since it involves sending the TV stream to multiple aircrafts (Aircraft #1 302, Aircraft #2 304, and Aircraft #3 306). The method as shown in FIG. 10 includes modifying the video program package based on a movement of one or more commercial passenger vehicles in a coverage area of a particular satellite beam. According to the dynamic multicast approach, the ground server allows the TV service to start when a first aircraft enters the beam coverage area corresponding to a particular beam. In the example of FIG. 10, the TV service refers to providing one or more video programs for passengers in one or more aircrafts. The TV service starts by transmitting a corresponding video program package including one or more video programs to a satellite providing the particular beam. Once a video program package is transmitted to a satellite, the ground server controls activating or deactivating a video program included in the video program package based on whether there are other commercial passenger vehicles in the beam coverage area. In some implementations, the activating or the deactivating may be done on a video program basis. When the TV stream for a particular video program is activated on a beam, the TV stream is provided through the beam to corresponding aircraft(s) flying on the area corresponding to the beam. When the TV stream is deactivated on the beam, the beam is not used to provide the TV stream and the TV stream is not transmitted through the beam.

Aircraft #1 302 is flying and entering the area corresponding to Beam #A 308 (hereinafter "beam #A coverage area"). At operation 314, Aircraft #1 302 informs the ground server that the aircraft 301 is entering the beam #A coverage area. The ground server obtains the beam coverage information indicating Beam #A for TV service in Aircraft #1 302. In response to receiving the beam coverage information, the ground server checks the subscription information corresponding to Aircraft #1 302. In this example, in response to receiving the beam coverage information, the ground server also checks whether there are any other aircrafts to which the TV stream is being transmitted through the Beam #A. It is assumed that there are no other aircrafts in the beam #A coverage area, to which the Beam #A is providing the TV stream. Thus, the ground server generates a video program package including the TV stream and transmits the video program package to the satellite providing Beam #A 308. The obtaining of the beam coverage information, the checking of subscription information, generating of the video program package, and the transmitting of the video program package have been already discussed with reference to FIG.

7, and the relevant description will be applied to the example in FIG. 10. By transmitting the TV stream from the ground server to the satellite providing the Beam #A, the TV stream is activated on Beam #A 308 at operation 314.

Aircraft #1 302 is leaving the Beam #A coverage area. At operation 318, Aircraft #1 302 informs the ground server that Aircraft #1 302 is leaving the beam #A coverage area. In response to receiving the indication, the ground server checks whether there are any other aircraft to which the TV stream is being transmitted through the Beam #A. Since there are no other aircrafts to which the TV stream being transmitted through the Beam #A, the ground server deactivates the TV stream on the Beam #A 308. Once the TV stream is deactivated on the Beam #A, the ground server can allocate a resource of the Beam #A freed up due to the deactivating of the TV stream for other services, for example, wireless network connectivity services.

Aircraft #2 304 is entering the beam #A coverage area. At operation 322, Aircraft #2 304 informs the ground server that Aircraft #2 304 is entering the beam #A coverage area. In response to receiving the beam coverage information, the ground server checks the subscription information corresponding to Aircraft #2 304. In this example, it is assumed that Aircraft #2 304 subscribes the TV stream which is also subscribed by Aircraft #1. The ground server also checks whether there are any other aircraft to which the TV stream is being transmitted through the Beam #A 308. Since there are no other aircrafts to which the TV stream is being transmitted through the Beam #A 308, the ground server transmits the TV stream to the satellite providing Beam #A 308. Thus, at operation 324, the TV stream is activated on Beam #A 308.

Aircraft #3 306 is entering the beam #A coverage area. At operation 326, Aircraft #3 306 informs the ground server that Aircraft #3 306 is entering the beam #A coverage area. In response to receiving the indication, the ground server checks the subscription information corresponding to Aircraft #3 306. In this example, it is assumed that Aircraft #3 306 subscribes the TV stream which is also subscribed by Aircraft #1 302 and Aircraft #2 304. The ground server also checks whether there are any other aircraft to which the TV stream is being transmitted through the Beam #A 308. Since there is Aircraft #2 to which the TV stream is being transmitted through the Beam #A 308, the TV stream can be provided through Beam #A for Aircraft #306.

Aircraft #2 304 is leaving the beam #A coverage area and entering the area corresponding to Beam #B 310 (hereinafter "Beam #B coverage area"). At operation 328, Aircraft #2 304 informs the ground server that Aircraft #2 304 is leaving the beam #A coverage area and entering the beam #B coverage area. In response to receiving the indication of leaving the beam #A coverage area, the ground server checks whether there are any other aircraft to which the TV stream is being transmitted through the Beam #A 308. Since there is Aircraft #3 306 to which the TV stream is being transmitted through the Beam #A 308, the ground server does not deactivate the TV stream on the Beam #A 308. In response to receiving the indication of entering the beam #B coverage area, the ground server checks whether there are any other aircraft to which the TV stream is being transmitted through the Beam #B 310. Since there are no other aircrafts to which the TV stream is being transmitted through the Beam #B 310, the ground server transmits the TV stream to the satellite providing Beam #B 310. Thus, at operation 330, the TV stream is activated on Beam #B 310.

Aircraft #3 306 is leaving the beam #A coverage area and entering the beam #B coverage area. At operation 332, Aircraft #3 306 informs the ground server that the aircraft 303 is leaving the beam #A coverage area and entering the beam #B coverage area. In response to receiving the indication of leaving the beam #A coverage area, the ground server checks no other aircrafts to which the TV stream is being transmitted through the Beam #A 308. Since there are no other aircrafts to which the TV stream is being transmitted through the Beam #A 308, the ground server deactivates the TV stream on the Beam #A 308. Thus, at operation 334, the TV stream is deactivated on the Beam #A 308. In response to receiving the indication of entering to the beam #B coverage area, the ground server checks whether no other aircrafts to which the TV stream is being transmitted through the Beam #B 310. Since there is Aircraft #2 in the beam #B coverage area, the TV stream can be provided through Beam #B for Aircraft #3 306.

Aircraft #1 302 is entering the beam #B coverage area. At operation 336, Aircraft #1 302 informs the ground server that Aircraft #1 302 is entering the beam #B coverage area. In response to receiving the indication, the ground server checks no other aircrafts to which the TV stream is being transmitted through the Beam #B 310. Since there are Aircraft #2 304 and Aircraft #3 306 to which the TV stream is being transmitted through the Beam #B 310, the TV stream can be provided through Beam #B 310 for Aircraft #1 302.

Aircraft #1 302 is leaving the beam #B coverage area. At operation 338, Aircraft #1 302 informs the ground server that Aircraft #1 302 is leaving the beam #B coverage area. In response to receiving the indication, the ground server may check whether there are any other aircrafts to which the TV stream is being transmitted through the Beam #B 310. Since there are Aircrafts #2 304 and Aircraft #3 306 to which the TV stream is being transmitted through the Beam #B 310, the ground server does not deactivate the TV stream on the Beam #B 310.

Aircraft #2 304 is leaving the beam #B coverage area. At operation 340, Aircraft #2 304 informs the ground server that Aircraft #2 304 is leaving the beam #B coverage area. In response to receiving the indication, the ground server may check whether there are any other aircrafts to which the TV stream is being transmitted through the Beam #B 310. Since there is Aircraft #3 306 to which the TV stream is being transmitted through the Beam #B 310, the ground server does not deactivate the TV stream on the Beam #B 310.

Aircraft #3 306 is leaving the beam #B coverage area. At operation 342, Aircraft #3 306 informs the ground server that Aircraft #3 306 is leaving the beam #B coverage area. In response to receiving the indication, the ground server may check whether the Aircraft #3 306 is the last aircraft in the corresponding area. Since there are no other aircrafts to which the TV stream being transmitted through the Beam #B, the ground server deactivates the TV stream on the Beam #B 310. Thus, at operation 344, the TV stream is deactivated on the Beam #B 310. Once the TV stream is deactivated on the Beam #B, the ground server can allocate a resource of the Beam #A freed up due to the deactivating of the TV stream for other services, for example, wireless network connectivity services.

According to the example method as shown in FIG. 10, the ground server controls activating or deactivating the TV stream on a corresponding beam based on whether there are any other aircrafts to which the TV stream is being transmitted through the corresponding beam. Once the TV stream is activated on a particular beam, an additional aircraft entering the area corresponding to the beam will find the TV stream is already active and can be provided with the TV stream through the particular beam. Accordingly, it is possible to save resources as compared when the same TV stream is transmitted using separate resources for the multiple aircrafts. The benefits of achieving bandwidth saving according to various implementations will be further explained with FIGS. 11-15 in the below.

FIG. 11 shows an example of a table that illustrates various scenarios (SC1, SC2, SC3 . . . SCN) showing how beams (Beam 1, Beam 2, Beam 3 . . . Beam N) are used for providing TV services for an aircraft. The beams (Beam 1, Beam 2, Beam 3 . . . Beam N) may correspond to Beam 1, Beam 2, Beam 3 . . . Beam N as shown in FIGS. 4 to 6. In the example, each of beams provides multiple channels (Channels 1, 2, 3 . . . M), each corresponding to a video program. In the example, the requests for the TV services can be made based on a program level from each aircraft. In the example as shown in FIG. 11, it is assumed that each beam has resources capable of providing four channels of the TV services. The first scenario (SC1) corresponds to the case where each beam is used for providing two channels of the TV services while two other channels are not provided through the beams. Thus, in the first scenario, there is at least one aircraft to which two channels of the TV services are being serviced through the beams. The second scenario (SC2) corresponds to the case where each beam is used for providing all four channels of the TV services. Thus, in the second scenario, there is at least one aircraft to which four channels of the TV services are being serviced through beams. The third scenario (SC3) corresponds to the case where each beam is used for providing three channels of the TV services while one channel is not provided through the beams. Thus, in the third scenario, there is at least one aircraft to which three channels of the TV services are being serviced through the beams. The Nth scenario (SCN) corresponds to the case where each beam is used for providing one channel of the TV services while three other channels are not provided through the beams. Thus, in the Nth scenario, there is at least one aircraft to which the one channel is being serviced through the beams. Different scenarios as shown in FIG. 11 may correspond to different demands for the TV services under various situations. For example, passengers may make different number of requests for TV services based on times of a day such that the Nth scenario (SCN) is when the aircraft is flaying late at night and most passengers are sleeping, and the second scenario (SC2) is when most passengers are awake and enjoying the TV services. While those four scenarios, SC1, SC2, SC3 . . . SCN, are illustrated, those scenarios are examples only and such patterns can be applied to other beams (not shown). According to the suggested implementations of the disclosed technology, it is possible to control the use of the bandwidths of a beam by activating or deactivating each channel corresponding to a subscribed video program. Thus, as compared to a case where all channels of subscribed video programs are always transmitted to corresponding aircrafts, TV services can be provided in more efficient manner.

Figure 12:
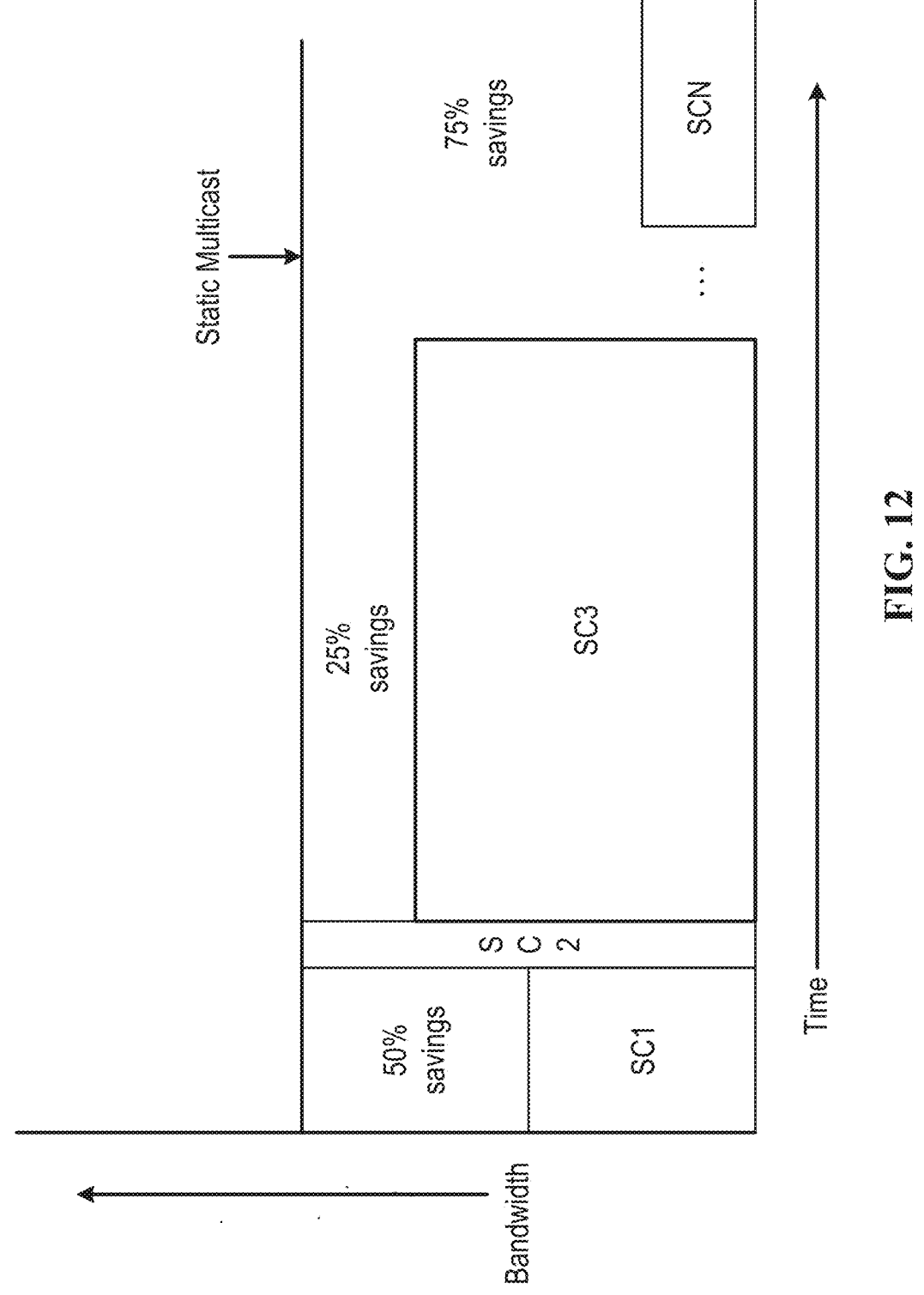
FIG. 12 shows an example of a diagram showing a bandwidth saving for each scenario as shown in FIG. 11 as compared to the case when all channels are used for providing TV services regardless of whether there is an aircraft on a corresponding beam.

FIG. 12 shows an example of a diagram showing a bandwidth saving for each scenario as shown in FIG. 11 as compared to the case when all channels are used for providing TV services regardless of whether there is an aircraft on a corresponding beam. For the first scenario (SC1), since two of four channels are used, 50% bandwidth can be saved. For the second scenario (SC2), since all four channels are used, no bandwidth is saved. For the third scenario (SC3), since three of four channels are used, 25% bandwidth can be saved. For the Nth scenario (SCN), since one of four channels are used, 75% bandwidth can be saved. According to the suggested implementations, one or more channels are selectively activated for providing TV services when there is at least one aircraft which subscribes corresponding channels. Thus, as compared to the case when all channels are always activated for providing TV services, it is possible to obtain bandwidth savings without wasting network bandwidth. The saved bandwidth can be used for providing other services than the TV services, for example, Wi-Fi services or others.

FIG. 13 shows an example of a table that illustrates various scenarios (SC11, SC22, SC33 . . . SCNN) showing how beams (Beam 11, Beam 12, Beam 13 . . . Beam 1N) are used for providing TV services for an aircraft. The beams (Beam 11, Beam 12, Beam 13 . . . Beam 1N) may correspond to Beam 11, Beam 2, Beam 3 . . . Beam N as shown in FIGS. 5 and 6. In the example, each of beams has multiple channels (Channels 1, 2, 3 . . . M), each corresponding to a video program. In the example, the requests from the TV services can be made based on a program level from each aircraft. In the example as shown in FIG. 13, it is assumed that each beam has resources capable of providing four channels of the TV services. The first scenario (SC11) corresponds to the case where each beam is used for providing two channels of the TV services while two other channels are not provided through the beams. Thus, in the first scenario, there is at least one aircraft to which two channels of the TV services are being serviced through the beams. The second scenario (SC22) corresponds to the case where each beam is used for providing all four channels of the TV services. Thus, in the second scenario, there is at least one aircraft to which the four channels of the TV services are being serviced through the beams. The third scenario (SC33) corresponds to the case where each beam is used for providing three channels of the TV services, while one channel is not provided through the beams. Thus, in the third scenario, there is at least one aircraft to which the three channels of the TV services are being serviced through the beams. The Nth scenario (SCNN) corresponds to the case where each beam is used for providing one channel of the TV services, while three channels are not provided through the beams. Thus, in the Nth scenario, there is at least one aircraft to which one used channel is being providing through the beams. While those four scenarios, SC11, SC22, SC33, SCNN, are illustrated, those scenarios are examples only and such patterns can be applied to other beams (not shown).

Figure 14:
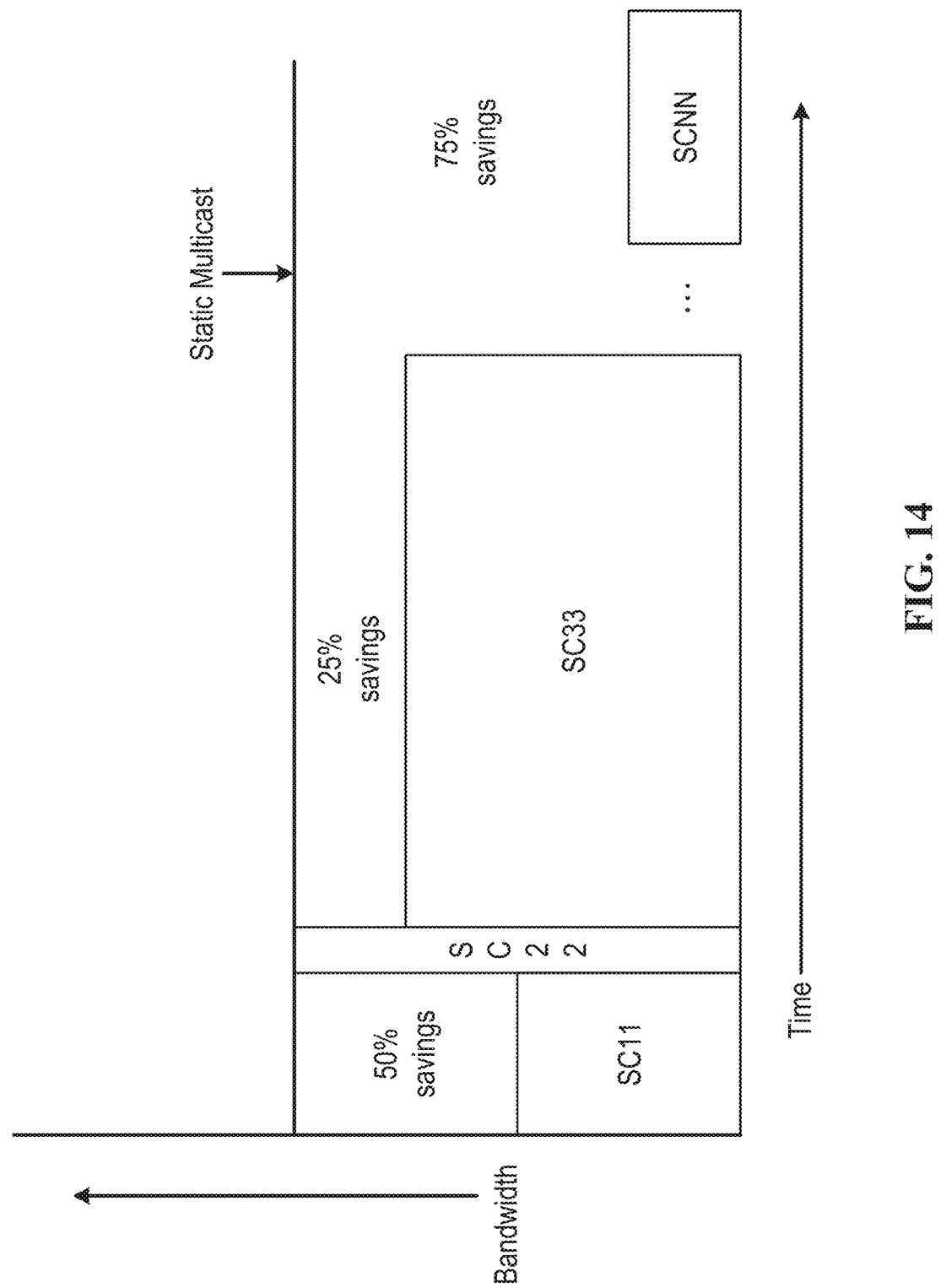
FIG. 14 shows an example of a diagram showing a bandwidth saving for each scenario as shown in FIG. 13 as compared to the case when all channels are used for providing TV services regardless of whether there is an aircraft on a corresponding beam.

FIG. 14 shows an example of a diagram showing a bandwidth saving for each scenario as shown in FIG. 13 as compared to the case when all channels are used for providing TV services regardless of whether there is an aircraft on a corresponding beam. For the first scenario (SC11), since two of four channels are used, 50% bandwidth can be saved. For the second scenario (SC22), since all four channels are used, no bandwidth is saved. For the third scenario (SC33), since three of four channels are used, 25% bandwidth can be saved. For the Nth scenario (SCNN), since one of four channels are used, 75% bandwidth can be saved.

Figure 15:
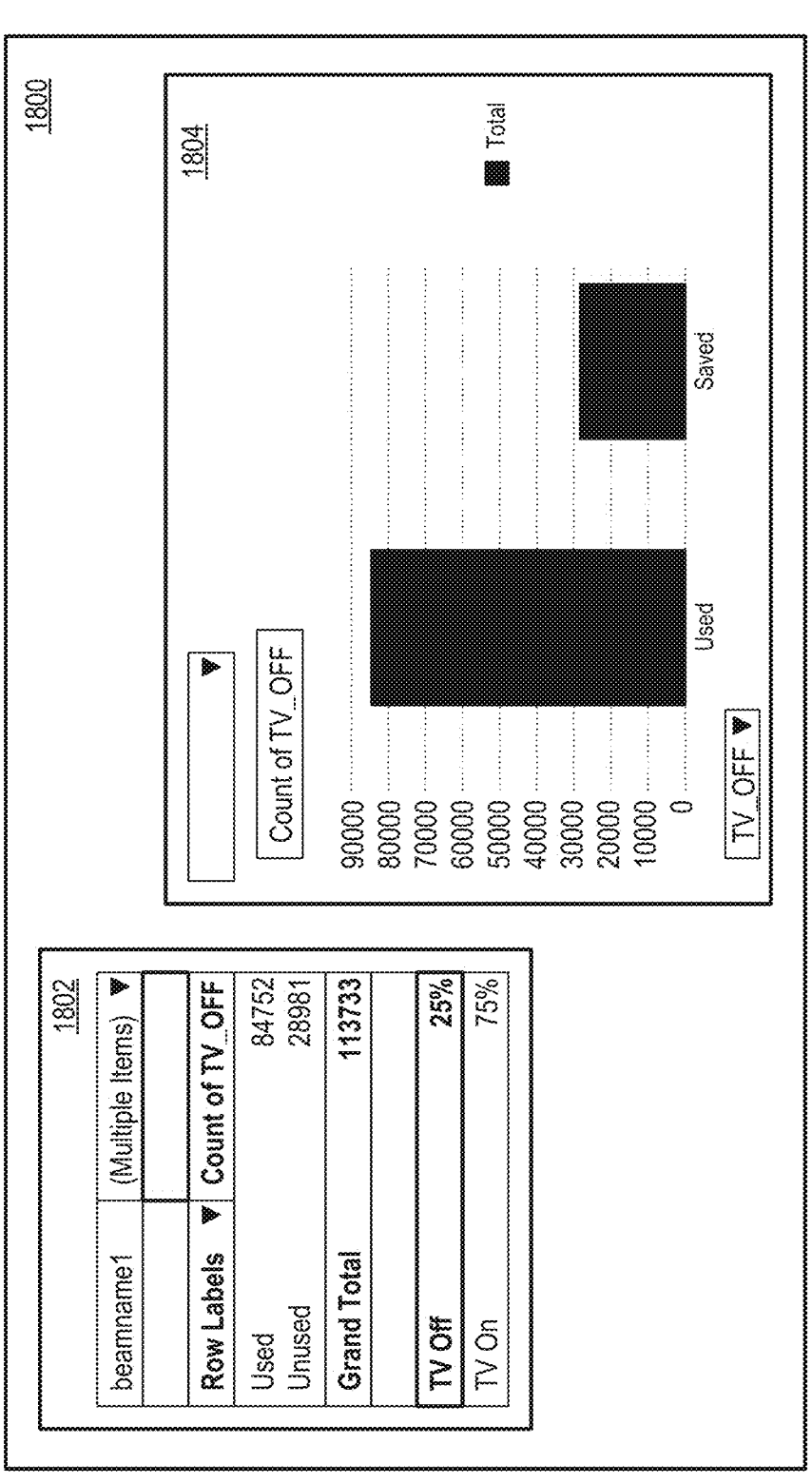
FIG. 15 shows an example showing a bandwidth saving estimation based on some implementations of the disclosed technology.

FIG. 15 shows an example showing a bandwidth saving estimation based on some implementations of the disclosed technology. The bandwidth saving estimation can be obtained by various analysis/estimation algorithms. The example 1800 as shown in FIG. 15 includes the table 1802 showing the used and unused resource amounts during a certain period of time. The example 1800 also includes a diagram 1804 showing the graphs showing the used and unused resource amounts during a certain period of time.

Based on the table 1802 and the diagram 1804, the amount of the saved resources (e.g., bandwidth) are estimated about 25% of the total resources.

Figure 16:
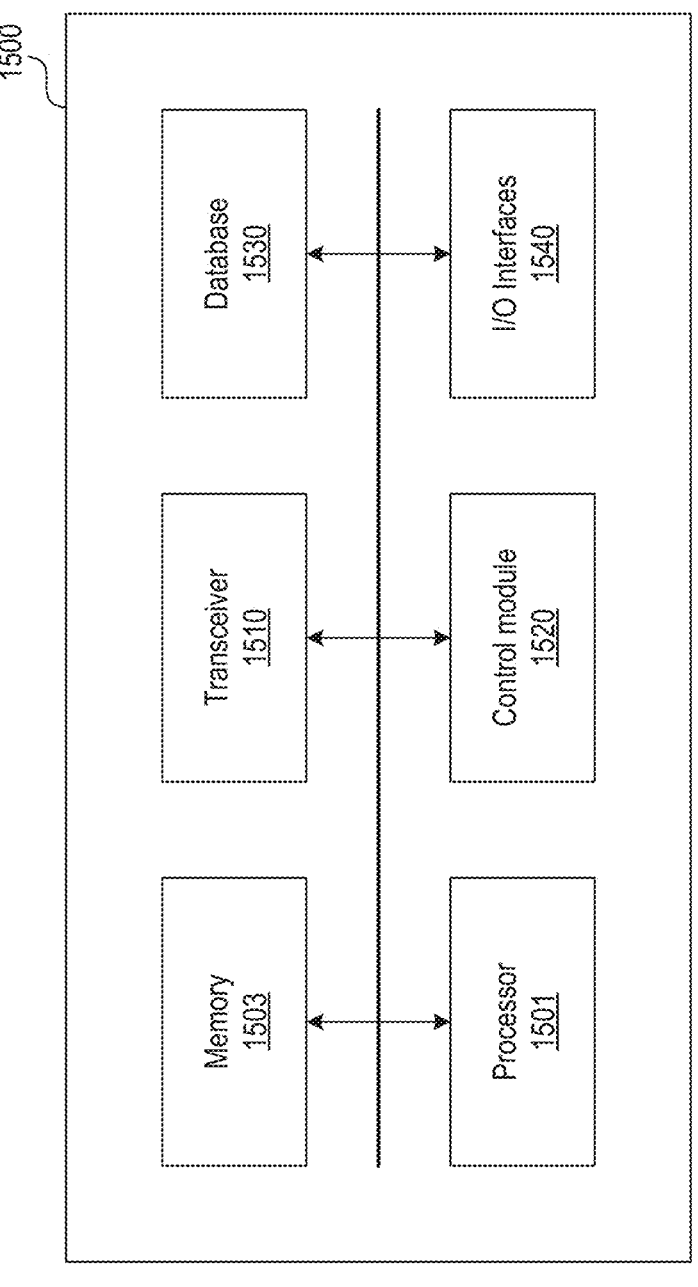
FIG. 16 shows an example block diagram of a computing device based on some implementations of the disclosed technology.

FIG. 16 shows an example block diagram of a computing device (e.g., an onboard server, a media playback device, a PED, or a ground server) based on some implementations of the disclosed technology. The computing device 1500 includes at least one processor 1501, a memory 1503, a transceiver 1510, a control module 1520, a database 1530, and an I/O (input/output) interface 1540. In other embodiments, additional, fewer, and/or different elements may be used to configure the computing device 1500. The memory 1503 may store instructions and applications to be executed by the processor 1501. The memory 1503 is an electronic holding place or storage for information or instructions so that the information or instructions can be accessed by the processor 1501. The memory 1503 can include, but is not limited to, any type of random-access memory (RAM), any type of read only memory (ROM), any type of flash memory, such as magnetic storage devices (e.g., hard disk, floppy disk, magnetic strips, etc.), optical disks (e.g., compact disc (CD), digital versatile discs (DVD), etc.), smart cards, flash memory devices, etc. The instructions upon execution by the processor 1501 configure the computing device 1500 to perform the operations (e.g., the operations as shown in FIGS. 7-10). The instructions executed by the processor 1501 may be carried out by a special purpose computer, logic circuits, or hardware circuits. The processor 1501 may be implemented in hardware, firmware, software, or any combination thereof. The term "execution" is, for example, the process of running an application or the carrying out of the operation called for by an instruction. The instructions may be written using one or more programming language, scripting language, assembly language, etc. By executing the instruction, the processor 201 can perform the operations called for by that instruction.

The processor 1501 operably couples with the memory 1503, the transceiver 1510, the control module 1520, the database 1530, and the I/O interface 1540, to receive, send, and process information and to control the operations of the computing device 1500. The processor 1501 may retrieve a set of instructions from a permanent memory device, such as a ROM device, and copy the instructions in an executable form to a temporary memory device that is generally some form of RAM. In some implementations, the computing device 1500 can include a plurality of processors that use the same or a different processing technology. The transceiver 1510 may include a transmitter and a receiver. In some embodiments, the computing device 1500 comprises a transmitter and a receiver that are separate from another but functionally form a transceiver. The transceiver 1510 transmits or sends information or data to another device (e.g., another server, a PED, etc.) and receives information or data transmitted or sent by another device (e.g., another server, a PED, etc.).

The control module 1520 of the computing device 1500 is configured to perform operations to assist the computing device 1500. In some implementations, the control module 1520 can be configured as a part of the processor 1501. When the computing device 1500 corresponds to the IFE system as shown in FIG. 1, the control module 1520 can be included in the airplane 102. In some implementations, the control module 1520 can operate machine learning/artificial intelligence (AI) applications that perform various types of data analysis to automate analytical model building. Using algorithms that iteratively learn from data, machine learning applications can enable computers to learn without being explicitly programmed. The machine learning/AI applications may be configured to use data learning algorithms to build models to interpret various data received from the various devices or components to detect, classify, and/or predict future outcomes. Such data learning algorithms may be associated with rule learning, artificial neural networks, inductive logic programming, and/or clustering. In some implementations, the control module 1520 may assist the computing device 1500 to perceive their environment and take actions that maximize the effectiveness of the operations performed by the computing device 1500.

The I/O interfaces 1540 enable data to be provided to the computing device 1500 as input and enable the computing device 1500 to provide data as output. In some embodiments, the I/O interfaces 1540 may enable user input to be obtained and received by the computing device 1500 (e.g., via a touch-screen display, buttons, switches) and may enable the computing device 1500 to display information. In some embodiments, devices, including touch screen displays, buttons, controllers, audio speakers, or others, are connected to the computing device 1500 via I/O interfaces 1540.

Figure 17:
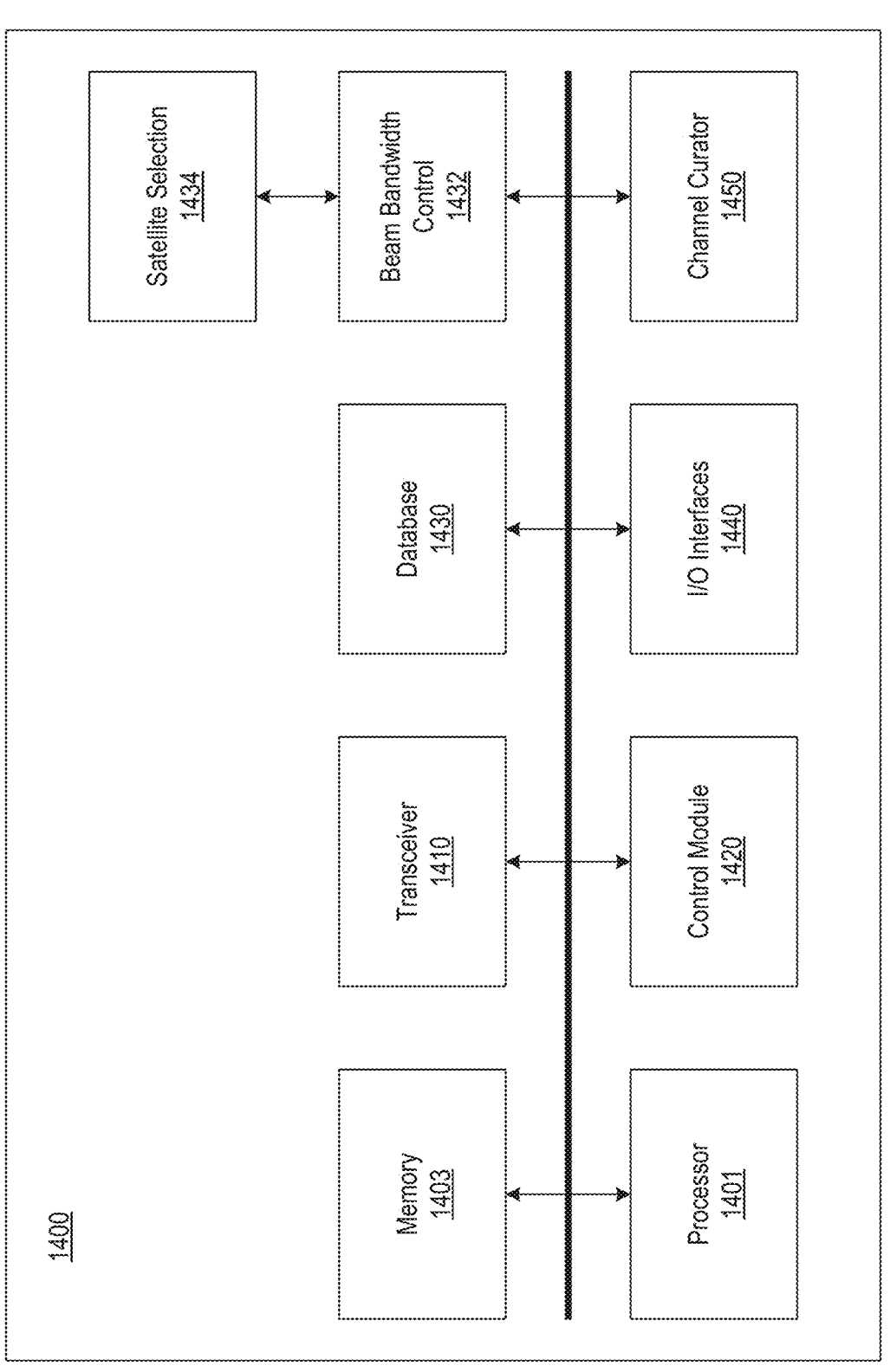
FIG. 17 shows an example block diagram of a ground server based on some implementations of the disclosed technology.

FIG. 17 shows an example block diagram of a computing device (e.g., a ground server) based on some implementations of the disclosed technology. The computing device 1400 includes elements, a processor 1401, a memory 1403, a transceiver 1410, a control module 1420, a database 1430, and an I/O (input/output) interface 1440, which correspond to the processor 1501, the memory 1503, the transceiver 1510, the control module 1520, the database 1530, and the I/O (input/output) interface 1540, which are shown in FIG. 16. Since the operations of these elements have been already described in relation to FIG. 16 and thus, the detailed descriptions on them will be omitted. As compared to FIG. 16, the example as shown in FIG. 17 includes additional elements of the ground server, which include a satellite selection 1434, a beam bandwidth control 1432, and a channel curator 1450.

The satellite selection 1434 may be configured to select one or more satellites among various satellites (e.g., Satellite 108, Satellite 109, Satellite 110, Satellite 111, Satellite 408, Satellite 410, Satellite 412, Satellite 414, Satellite 416, Satellite 418, Satellite 420, Satellite 422, Satellite 424, Satellite 4NW, Satellite 4NY, Satellite 4NZ, which are shown in FIGS. 4-6.). In some implementations, the satellite selection 1434 may be configured as a lookup table or a map, which shows which satellite to which the ground server is to be connected based on the obtained beam coverage information. When the ground server obtains the beam coverage information, the satellite selection 1434 selects corresponding satellites to the beam coverage information. The ground server may communicate with the selected satellite and send the feedback information to the selected satellite. The channel curator 1450 is configured to allow the ground server to obtain multiple channel information corresponding to each of beams. As discussed with reference to FIGS. 11 and 13, each beam provides multiple channels (Channels 1, 2, 3 . . . M) of video contents, each channel corresponding to a corresponding video program. The ground server obtains channel information available on each beam by the channel curator 1450 and performs a beam bandwidth control by the beam bandwidth control 1432 to optimize the efficiency in using beam bandwidths. The beam bandwidth control 1432 is configured to control the use of the bandwidths provided by the beams. The beam bandwidth control 1432 may select one or more channels based on the subscription information of each aircraft and/or requests for TV services from the passengers. In some implementations, the beam bandwidth control 1432 may select one or more channels, which the aircraft is subscribed to, among channels provided by a corresponding beam to turn on the TV services. In some implementations, the beam bandwidth control 1332 may select the one or more channels further based on the request from the passengers, e.g., which video programs are requested from the passengers. With the selection of the channels, the beam bandwidth control 1432 can manage the saved bandwidths to be used for providing other services such as Wi-Fi services.

FIG. 18 shows an example of a configuration of a video streaming service system based on some implementations of the disclosed technology. As compared to FIG. 2, the satellite selection 1330, the beam bandwidth control 1332, and the channel curator 1336 have been added. Since those elements are discussed with reference to FIG. 15, the detailed description will be omitted. In addition, the multiple airplanes, Airplane 1 (AP1), Airplane 2 (AP2), Airplane 3 (AP3) . . . Airplane W (APW), are illustrated. Although some description above is provided for a single airplane in this document, one those skilled in the art can understand that such description can be applied to the multiple airplanes. The remaining elements are discussed with reference to FIG. 2, and thus the detailed description will be omitted.

Various implementations of the disclosed technology suggest providing the video streaming services based on the feedback information a ground server provides to one or more satellites. In some implementations, the feedback information is provided whether to turn on or off the TV services on a corresponding satellite beam based on the subscription information and further based on whether there exists another aircraft being serviced through the corresponding satellite beam. With the suggested implementations, it is possible to save resources for providing the video streaming services and manage the data load transmitted from the corresponding beam. With the implementations, it is still possible to use the saved resources for providing other services such as Wi-Fi services through the established connections between the satellite and the aircraft.

Various techniques preferably incorporated within some embodiments may be described using the following solution-based format.

1. A method for providing video programs for passengers on commercial passenger vehicles, comprising: obtaining satellite beam coverage information indicative of beam coverages of one or more commercial passenger vehicles by one or more satellites; checking subscription information corresponding to a subset of commercial passenger vehicles in a beam coverage area of a particular satellite beam; generating, based on a result of the checking, a video program package including one or more video programs subscribed by the subset of commercial passenger vehicles; and transmitting the video program package to a satellite providing the particular satellite beam such that the one or more video programs of the video program package are transmitted through the particular satellite beam to the subset of commercial passenger vehicles.

2. The method of solution 1, wherein the satellite beam coverage information is obtained based on a message received from the one or more commercial passenger vehicles.

3. The method of solution 1, wherein the satellite beam coverage information is obtained based on a satellite coverage map of one or more satellites, each providing one or more satellite beams.

4. The method of solution 1, further comprising: determining whether to reorganize the video program package based on a predetermined condition; and reorganizing the video program package based on the determining.

5. The method of solution 4, wherein the predetermined condition is based on requests from the passengers in the subset of commercial passenger vehicles, and the reorganizing of the video program package includes omitting a first video program that is not requested by any passenger in the subset of the commercial passenger vehicle or adding a second video program that is newly requested by any passenger in the subset of the commercial passenger vehicle.

6. The method of solution 4, wherein the predetermined condition is based on a movement of one or more commercial passenger vehicles in the beam coverage area, and the reorganizing of the video program package includes deactivating a first video program from the video program package due to a first aircraft leaving the beam coverage area or activating a second video program in the video program package due to a second aircraft entering the beam coverage area.

7. The method of solution 4, further comprising: allocating a bandwidth freed up due to omitting a first video program from the video program package to be utilized for a different use from providing the first video program.

8. The method of solution 5, further comprising: allocating a bandwidth to a second video program added to the video program package by taking away the bandwidth assigned for other programs in the video program package or by deleting another video program from the video program package.

9. The method of solution 1, further comprising, after the transmitting the video program package: detecting an additional commercial passenger vehicle entering to the beam coverage area, and wherein the video program package is transmitted through the particular satellite beam to the additional commercial passenger vehicle.

10. The method of solution 1, wherein the one or more satellites include a first set of satellites placed at a first distance from an earth and a second set of satellites placed at a second distance from the earth, the second distance being different from the first distance.

11. A method of providing entertainment content to subscribers in a commercial passenger vehicle, comprising: detecting, by a ground-based server, a movement of one or more commercial passenger vehicles in a coverage area of a particular satellite beam; modifying a video program package based on the detecting such that a first video program is deactivated from the video program package due to a first aircraft leaving the coverage area, or a second video program is activated in the video program package due to a second aircraft entering the coverage area.

12. The method of solution 11, wherein the modifying of the video program package is performed based on whether there are any other aircraft to which a video program included in the video program package is being transmitted through the particular beam.

13. The method of solution 11, wherein the first video program is deactivated when there are no other aircrafts to which the first video program is being transmitted through the particular satellite beam.

14. The method of solution 11, wherein the second video program is activated when there are no other aircrafts to which the second video program is being transmitted through the particular satellite beam.

15. The method of solution 11, further comprising: allocating a bandwidth freed up due to deactivating of the first video program for other services than providing of the first video program.

16. The method of solution 11, further comprising: allocating a bandwidth to the second video program by taking away the bandwidth assigned for other programs in the video program package or by deactivating the first video program from the video program package.

17. The method of solution 11, wherein the ground-based server is configured to be in communication with multiple satellites including a first set of satellites placed at a first distance from an earth and a second set of satellites placed at a second distance from the earth, the second distance being different from the first distance.

18. A system for providing video programs for passengers on commercial passenger vehicles, comprising: a storage configured to store subscription information indicative one or more video programs subscribed by each of the commercial passenger vehicles; and a server disposed outside the commercial passenger vehicle and in communication with the storage, the commercial passenger vehicles, and one or more satellites providing corresponding beam coverage areas; and wherein the server is configured to obtain satellite beam coverage information indicative of beam coverages of one or more commercial passenger vehicles and transmit a video program package including one or more video programs selected based on subscription information corresponding to a subset of commercial passenger vehicles in a beam coverage area of a particular satellite beam.

19. The system of solution 18, wherein the server is further configured to: determine whether to reorganize the video program package based on a predetermined condition; and reorganize the video program package based on the determining.

20. The system of solution 18, wherein the predetermined condition is based on requests from the passengers in the subset of commercial passenger vehicles, and wherein the server is configured to reorganize the video program package by omitting a first video program that is not requested by any passenger in the subset of the commercial passenger vehicle or adding a second video program that is newly requested by any passenger in the subset of the commercial passenger vehicle.

21. The system of solution 18, wherein the predetermined condition is based on a movement of one or more commercial passenger vehicles in the beam coverage area, and wherein the server is further configured to: wherein the server is further configured to reorganize the video program package by deactivating a first video program from the video program package due to a first aircraft leaving the beam coverage area or activating a second video program in the video program package due to a second aircraft entering the beam coverage area.

22. The system of solution 18, wherein the server is further configured to: control a use of a bandwidth of the particular satellite beam based on the reorganizing of the video program package.

In some implementations, the machine learning/AI applications may compile coded descriptions into lower-level structured data objects that a machine can more readily understand, build a network topology of the main problem concept and sub-concepts covering aspects of the problem to be solved, train codified instantiations of the sub-concepts and main concept, and execute a trained AI model containing one, two, or more neural networks. The machine learning/AI applications can abstract away and automate the low-level mechanics of AI, and the machine learning/AI applications can manage and automate much of the lower-level complexities of working with AI. Each program developed in a pedagogical programming language can be fed into the machine learning/AI applications to generate and train appropriate intelligence models. The machine learning/AI applications can be a cloud-hosted platform configured to manage complexities inherent to training AI networks. Thus, the machine learning/AI applications can be accessible with one or more client-side interfaces to allow third parties to submit a description of a problem in a pedagogical programming language and let the online AI engine build and generate a trained intelligence model for one or more of the third parties. In some implementations, the machine learning/AI applications can be employed to algorithms, e.g., selecting the satellite from a group of satellites, evaluating saved resources and managing the use of the saved resources for other services than the video streaming services, and/or providing updates to the satellite information for the ground server, etc.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware, or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described, and other implementations, enhancements and variations can be made based on what is described and illustrated in this patent document.

What is claimed is:

1. A method for providing video programs for passengers on commercial passenger vehicles, comprising:
   obtaining satellite beam coverage information indicative of beam coverages of one or more commercial passenger vehicles by one or more satellites;
   checking subscription information corresponding to a subset of commercial passenger vehicles in a beam coverage area of a particular satellite beam;
   generating, based on a result of the checking, a video program package including one or more video programs subscribed by the subset of commercial passenger vehicles; and
   transmitting the video program package to a satellite providing the particular satellite beam such that the one or more video programs of the video program package are transmitted through the particular satellite beam to the subset of commercial passenger vehicles including multiple commercial passenger vehicles,
   wherein the one or more video programs of the video program package are deactivated on the particular satellite beam in response to satisfying a condition that there are no other commercial passenger vehicles to which the one or more video programs are being transmitted through the particular satellite beam, and wherein the one or more video programs of the video program package are activated in response to not satisfying the condition.

2. The method of claim 1, wherein the satellite beam coverage information is obtained based on a message received from the one or more commercial passenger vehicles, and wherein the satellite beam coverage information is obtained based on a satellite coverage map of one or more satellites, each providing one or more satellite beams.

3. The method of claim 1, wherein the one or more satellites include a first set of satellites placed at a first distance from an earth and a second set of satellites placed at a second distance from the earth, the second distance being different from the first distance.

4. The method of claim 1, further comprising:

determining whether to reorganize the video program package based on a predetermined condition; and reorganizing the video program package based on the determining.

5. The method of claim 4, wherein the predetermined condition is based on requests from the passengers in the subset of commercial passenger vehicles, and the reorganizing of the video program package includes omitting a first video program that is not requested by any passenger in the subset of the commercial passenger vehicles or adding a second video program that is newly requested by any passenger in the subset of the commercial passenger vehicles.

6. The method of claim 5, further comprising:

allocating a bandwidth to a second video program added to the video program package by taking away the bandwidth assigned for other programs in the video program package or by deleting another video program from the video program package.

7. The method of claim 4, wherein the predetermined condition is based on a movement of one or more commercial passenger vehicles in the beam coverage area, and the reorganizing of the video program package includes deactivating a first video program from the video program package due to a first aircraft leaving the beam coverage area or activating a second video program in the video program package due to a second aircraft entering the beam coverage area.

8. The method of claim 4, further comprising:

allocating a bandwidth freed up due to omitting a first video program from the video program package to be utilized for a different use from providing the first video program.

9. The method of claim 1, further comprising, after the transmitting the video program package:

detecting an additional commercial passenger vehicle entering to the beam coverage area, and wherein the video program package is transmitted through the particular satellite beam to the additional commercial passenger vehicle.

10. A system for providing video programs for passengers on commercial passenger vehicles, comprising:

a storage configured to store subscription information indicative one or more video programs subscribed by each of the commercial passenger vehicles; and a server disposed outside the commercial passenger vehicles and in communication with the storage, the commercial passenger vehicles, and one or more satellites providing corresponding beam coverage areas; and wherein the server is configured to obtain satellite beam coverage information indicative of beam coverages of one or more commercial passenger vehicles and transmit a video program package including one or more video programs selected based on subscription information corresponding to a subset of commercial passenger vehicles including multiple commercial passenger vehicles in a beam coverage area of a particular satellite beam, wherein the one or more video programs of the video program package are deactivated on the particular satellite beam in response to satisfying a condition that there are no other commercial passenger vehicles to which the one or more video programs are being transmitted through the particular satellite beam, and wherein the one or more video programs of the video program package are activated in response to not satisfying the condition.

11. The system of claim 10, wherein the server is further configured to:

determine whether to reorganize the video program package based on a predetermined condition; and reorganize the video program package based on the determining.

12. The system of claim 11, wherein the predetermined condition is based on requests from the passengers in the subset of commercial passenger vehicles, and wherein the server is configured to reorganize the video program package by omitting a first video program that is not requested by any passenger in the subset of the commercial passenger vehicles or adding a second video program that is newly requested by any passenger in the subset of the commercial passenger vehicles.

13. The system of claim 11, wherein the predetermined condition is based on a movement of one or more commercial passenger vehicles in the beam coverage area, and wherein the server is further configured to:

wherein the server is further configured to reorganize the video program package by deactivating a first video program from the video program package due to a first aircraft leaving the beam coverage area or activating a second video program in the video program package due to a second aircraft entering the beam coverage area.

14. The system of claim 11, wherein the server is further configured to:

control a use of a bandwidth of the particular satellite beam based on the reorganizing of the video program package.

15. The system of claim 10, wherein the server is further configured to check subscription information corresponding to the subset of commercial passenger vehicles in the beam coverage area of the particular satellite beam.

16. The system of claim 10, wherein the satellite beam coverage information is obtained based on a message received from the one or more commercial passenger vehicles, and wherein the satellite beam coverage information is obtained based on a satellite coverage map of one or more satellites, each providing one or more satellite beams.

17. The system of claim 10, wherein the one or more satellites include a first set of satellites placed at a first distance from an earth and a second set of satellites placed at a second distance from the earth, the second distance being different from the first distance.

18. The system of claim 10, wherein the server is further configured to:

detect an additional commercial passenger vehicle entering to the beam coverage area, and wherein the video program package is transmitted through the particular satellite beam to the additional commercial passenger vehicle.

* * * * *